(12) United States Patent
Wade et al.

(10) Patent No.: US 9,049,375 B2
(45) Date of Patent: Jun. 2, 2015

(54) OPTICAL UNIT WITH SHAKE CORRECTING FUNCTION

(75) Inventors: Tatsuki Wade, Nagano (JP); Shinroku Asakawa, Nagano (JP); Shinji Minamisawa, Nagano (JP); Toshiyuki Karasawa, Nagano (JP); Katsushige Yanagisawa, Nagano (JP); Yoshihiro Hamada, Nagano (JP); Hayato Naito, Nagano (JP); Ryoji Komatsu, Nagano (JP); Hisahiro Ishihara, Nagano (JP)

(73) Assignee: NIDEC SANKYO CORPORATION (JP)

( * ) Notice: Subject to any disclaimer, the term of this patent is extended or adjusted under 35 U.S.C. 154(b) by 218 days.

(21) Appl. No.: 13/702,426
(22) PCT Filed: May 24, 2011
(86) PCT No.: PCT/JP2011/061815
§ 371 (c)(1),
(2), (4) Date: Dec. 6, 2012
(87) PCT Pub. No.: WO2011/155315
PCT Pub. Date: Dec. 15, 2011

(65) Prior Publication Data
US 2013/0100304 A1 Apr. 25, 2013

(30) Foreign Application Priority Data
Jun. 8, 2010 (JP) ................... 2010-131389

(51) Int. Cl.
H04N 5/228 (2006.01)
H04N 5/232 (2006.01)
G03B 5/00 (2006.01)
(52) U.S. Cl.
CPC .............. *H04N 5/23264* (2013.01); *G03B 5/00* (2013.01); *G03B 2205/0023* (2013.01); *G03B 2205/0069* (2013.01); *H04N 5/23287* (2013.01); *H04N 5/23258* (2013.01)

(58) Field of Classification Search
CPC ...... H04N 5/2253; H04N 5/23287; G03B 5/00
USPC ................................ 348/208.2, 208.7, 208.11
See application file for complete search history.

(56) References Cited

U.S. PATENT DOCUMENTS

2009/0021105 A1* 1/2009 Evans ........................... 310/261
2009/0095881 A1 4/2009 Funakubo et al.
2012/0044368 A1* 2/2012 Lin et al. .................... 348/208.2

FOREIGN PATENT DOCUMENTS

JP  4-211230 A   8/1992
JP  11-289105 A  10/1999
(Continued)

OTHER PUBLICATIONS

International Search Report for International Application No. PCT/JP2011/061815, dated Jul. 5, 2011, with English translation.
(Continued)

*Primary Examiner* — Paul Berardesca
(74) *Attorney, Agent, or Firm* — Cantor Colburn LLP

(57) ABSTRACT

An optical unit may include a fixed body; a movable module which holds an optical element; a swing support point which swingably supports the movable module; a shake correction drive mechanism which swings the movable module with the swing support point as a swing center around two axial lines intersecting an optical axis direction of the optical element between an outer peripheral face of the movable module and the fixed body; a first photo reflector provided between a bottom part of the movable module and the fixed body at a position superposing on one of the two axial lines and that detects displacement of the movable module; and a second photo reflector provided between the bottom part of the movable module and the fixed body at a position superposing on the other of the two axial lines and that detects displacement of the movable module.

17 Claims, 12 Drawing Sheets

(56) References Cited

FOREIGN PATENT DOCUMENTS

| | | |
|---|---|---|
| JP | 11-352544 A | 12/1999 |
| JP | 2002-207148 A | 7/2002 |
| JP | 2010-72563 A | 4/2010 |
| WO | 2009/133690 A1 | 11/2009 |

OTHER PUBLICATIONS

Non-Final Office Action related to corresponding U.S. Appl. No. 14/590,268; Date of Mailing: Mar. 13, 2015.

* cited by examiner

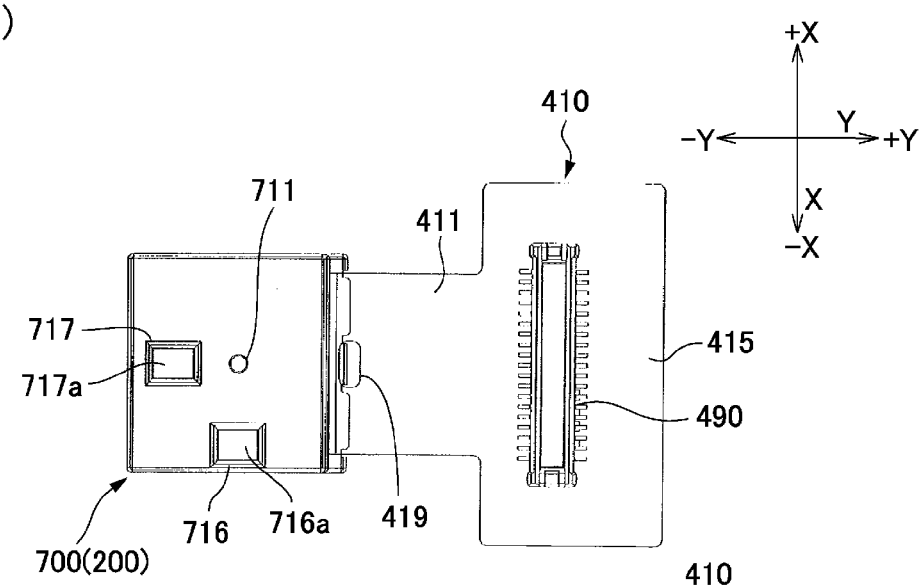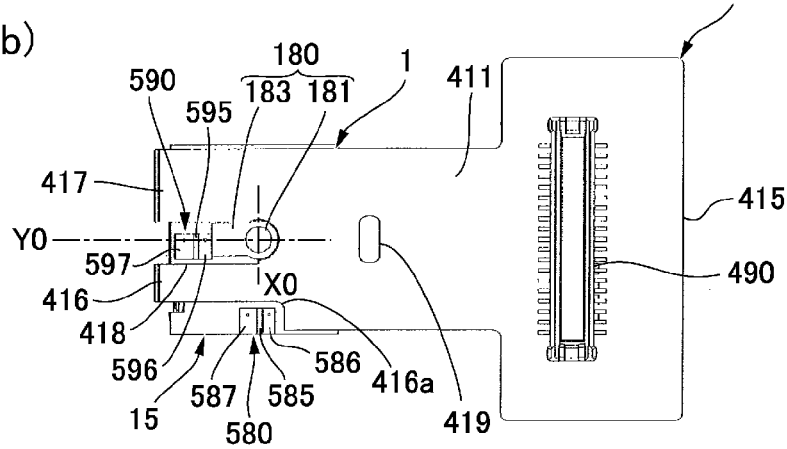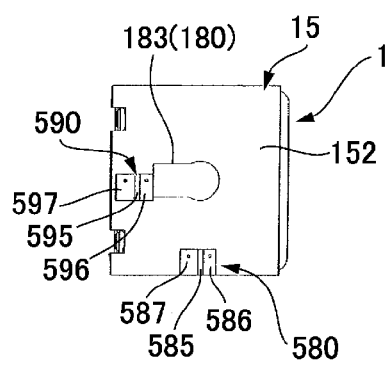

OPTICAL UNIT WITH SHAKE CORRECTING FUNCTION

CROSS REFERENCE TO RELATED APPLICATION

This is a U.S. national stage of application No. PCT/JP2011/061815, filed on 24 May 2011. Priority under 35 U.S.C. §119(a) and 35 U.S.C. §365(b) is claimed from Japanese Application No. 2010-131389, filed 8 Jun. 2010, the disclosure of which are also incorporated herein by reference.

TECHNICAL FIELD

The present invention relates to an optical unit with a shake correcting function which is mounted on a cell phone with a camera or the like.

BACKGROUND

In recent years, an optical device such as a cell phone is structured on which an optical unit for photographing is mounted. In the optical unit, in order to restrain or reduce any disturbance of a photographed image due to a shake in the hand of a user, a technique has been proposed in which an angular velocity sensor, a photo reflector and a shake correction drive mechanism are disposed around a lens and, on the basis of a detection result for a shake by the angular velocity sensor, the shake correction drive mechanism is controlled and the position of the lens is monitored by the photo reflector (see Patent Literature 1).

[PTL 1] Japanese Patent Laid-Open No. 2002-207148

However, like the structure described in Patent Literature 1, when the photo reflector and the shake correction drive mechanism are disposed around the lens, a size in a direction intersecting an optical axis direction becomes extremely large. This problem is not limited to a case that a shake of hand is corrected in an optical unit for photographing and is common to a case that a shake is corrected in an optical unit.

SUMMARY

In view of the problem described above, at least an embodiment of the present invention provides an optical unit with a shake correcting function in which the increase of size in the optical axis direction and the direction intersecting the optical axis direction can be restrained even when a photo reflector and a shake correction drive mechanism are provided on the movable module having an optical element.

In order to attain the above, at least an embodiment of the present invention provides an optical unit with a shake correcting function including a fixed body, a movable module which holds an optical element, a swing support point which swingably supports the movable module between a bottom part of the movable module and the fixed body, a shake correction drive mechanism which is structured to swing the movable module with the swing support point as a swing center around two axial lines intersecting an optical axis direction of the optical element between an outer peripheral face of the movable module and the fixed body, a first photo reflector which is provided between the bottom part of the movable module and the fixed body at a position superposing on one of the two axial lines in the optical axis direction and is structured to detect displacement of the movable module, and a second photo reflector which is provided between the bottom part of the movable module and the fixed body at a position superposing on the other of the two axial lines in the optical axis direction and is structured to detect displacement of the movable module.

In the optical unit with a shake correcting function (optical unit) in accordance with at least an embodiment of the present invention, a shake correction drive mechanism for swinging the movable module is provided and thus, when a shake such as a hand shake occurs in the optical unit, the movable module can be swung so as to cancel the shake. Therefore, even when the optical unit is shaken, inclination of the optical axis can be corrected. Further, in two axial lines when the movable module is to be swung, the first photo reflector is provided at the position superposing on one of the axial lines in the optical axis direction and the second photo reflector is provided at the position superposing on the other axial line in the optical axis direction and thus, respective shakes of the movable module for two axial lines are monitored and controlled by the first photo reflector and the second photo reflector. In addition, the shake correction drive mechanism is provided between the outer peripheral face of the movable module and the fixed body, and the first photo reflector and the second photo reflector are provided by utilizing a space where the swing support point is provided between the bottom part of the movable module and the fixed body. Therefore, even when the photo reflector and the shake correction drive mechanism are provided on the movable module, the increase of size in the optical axis direction and the direction intersecting the optical axis direction can be restrained.

In at least an embodiment of the present invention, it is preferable that the optical unit with a shake correcting function includes a flexible circuit board which is extended in a direction intersecting the optical axis direction between the bottom part of the movable module and the fixed body so as to avoid positions superposing on the first photo reflector and the second photo reflector in the optical axis direction. Each of the first photo reflector and the second photo reflector is provided with a rectangular planar shape and extended directions of long sides of the first photo reflector and the second photo reflector are parallel to an extended direction of the flexible circuit board. According to this structure, a region where the first photo reflector and the second photo reflector occupy in a widthwise direction of the flexible circuit board is narrow and thus the flexible circuit board can be extended with a wide width dimension.

In at least an embodiment of the present invention, it is preferable that the first photo reflector and the second photo reflector are disposed so that their respective light emitting parts are set close to each other or their respective light receiving parts are set close to each other. According to this structure, a sufficient distance is secured between the light emitting part of the first photo reflector and the light receiving part of the second photo reflector and between the light emitting part of the second photo reflector and the light receiving part of the first photo reflector and thus a cross talk between the first photo reflector and the second photo reflector can be prevented.

In at least an embodiment of the present invention, it is preferable that the optical unit with a shake correcting function includes a light shielding layer which is provided on at least two side faces of four side face parts of the first photo reflector in which the four side face parts are set in directions intersecting the optical axis direction, at least the two side faces being disposed on a side where the second photo reflector is located, and a light shielding layer which is provided on at least two side faces of four side face parts of the second photo reflector in which the four side face parts are set in directions intersecting the optical axis direction, at least the two side faces being disposed on a side where the first photo reflector is located. According to this structure, the light emitted from the light emitting part of the first photo reflector is prevented from being incident on the light receiving part of the second photo reflector and the light emitted from the light emitting part of the second photo reflector is prevented from being incident on the light receiving part of the first photo reflector and thus a cross talk between the first photo reflector and the second photo reflector can be prevented.

In at least an embodiment of the present invention, it is preferable that the optical unit with a shake correcting function includes a first reflection part which is provided in the fixed body so as to superpose on the first photo reflector in the optical axis direction, and a second reflection part which is provided in the fixed body so as to superpose on the second photo reflector in the optical axis direction. The first photo reflector and the second photo reflector are provided in the bottom part of the movable module, and the first reflection part and the second reflection part are recessed in a direction apart from the bottom part of the movable module with respect to a portion of the fixed body which is located around the first reflection part and a portion of the fixed body which is located around the second reflection part. According to this structure, even in a case that a sufficient distance is required to secure between the first photo reflector and the first reflection part and between the second photo reflector and the second reflection part, a portion close to the bottom part of the movable module can be provided in the fixed body. Therefore, when the swing support point is provided at the close portion, a region where the swing support point occupies is narrowed. Accordingly, a space for disposing the first photo reflector and the second photo reflector can be secured between the bottom part of the movable module and the fixed body.

In at least an embodiment of the present invention, it may be structured that the optical unit with a shake correcting function includes a first reflection part which is provided in the fixed body so as to superpose on the first photo reflector in the optical axis direction, and a second reflection part which is provided in the fixed body so as to superpose on the second photo reflector in the optical axis direction. The first photo reflector and the second photo reflector are provided in the bottom part of the movable module, and the first reflection part and the second reflection part are formed in the same plane with respect to a portion of the fixed body which is located around the first reflection part and a portion of the fixed body which is located around the second reflection part.

In at least an embodiment of the present invention, it is preferable that a portion of the fixed body which faces the bottom part of the movable module is structured of a metal member that is non-magnetized by heat treatment. In a case that a portion in the fixed body which faces the bottom part of the movable module is to be structured, when machine working is performed on metal material such as SUS304, the metal material may be provided with magnetic property. However, when the metal material is non-magnetized by heat treatment, attraction and the like to the permanent magnet can be prevented at the time of assembling the optical unit. Further, when heat treatment is performed on the metal material such as SUS304, its reflectance becomes high and thus the first reflection part and the second reflection part having high reflectance are obtained.

In at least an embodiment of the present invention, it is preferable that the bottom part of the movable module includes a circuit board on which the first photo reflector and the second photo reflector are mounted, and a face of the circuit board on an opposite side to a face where the first photo reflector and the second photo reflector are mounted is mounted with an imaging element. According to this structure, the first photo reflector and the second photo reflector are mounted on the same circuit board for the imaging element and thus the number of part items is reduced.

In the optical unit with a shake correcting function (optical unit) in accordance with at least an embodiment of the present invention, a shake correction drive mechanism for swinging the movable module is provided and thus, when a shake such as a hand shake occurs in the optical unit, the movable module can be swung. Therefore, even when the optical unit is shaken, inclination of the optical axis can be corrected. Further, in two axial lines when the movable module is to be swung, the first photo reflector is provided at the position superposing on one of the axial lines in the optical axis direction and the second photo reflector is provided at the position superposing on the other axial line in the optical axis direction and thus, respective shakes of the movable module are controlled for the two axial lines. In addition, the shake correction drive mechanism is provided between the outer peripheral face of the movable module and the fixed body, and the first photo reflector and the second photo reflector are provided by utilizing a space where the swing support point is provided between the bottom part of the movable module and the fixed body. Therefore, even when the photo reflector and the shake correction drive mechanism are provided on the movable module, the increase of size in the optical axis direction and the direction intersecting the optical axis direction can be restrained.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 9(a), 9(b) and 9(c) are explanatory views showing a positional relationship between photo reflectors and a flexible circuit board in the optical unit with a shake correcting function in accordance with the first embodiment of the present invention.

DESCRIPTION OF EMBODIMENTS

Embodiments of the present invention will be described below with reference to the accompanying drawings. In the following description, a structure for preventing a hand shake in a photographing unit will be described as an example for an optical element unit. Further, in the following description, three directions perpendicular to each other are set to be an "X"-axis, a "Y"-axis and a "Z"-axis and a direction along an optical axis "L" (lens optical axis) is set to be the "Z"-axis. Further, in the following description, regarding swings of the respective directions, turning around the "X"-axis corresponds to a so-called pitching (vertical swing), turning around the "Y"-axis corresponds to a so-called yawing (lateral swing), and turning around the "Z"-axis corresponds to a so-called rolling. Further, "+X" is indicated on one side of the "X"-axis, "−X" is indicated on the other side, "+Y" is indicated on one side of the "Y"-axis, "−Y" is indicated on the other side, "+Z" is indicated on one side (opposite side to an object side) of the "Z"-axis, and "−Z" is indicated on the other side (object side).

First Embodiment

Entire Structure of Optical Unit for Photographing

Figure 1:
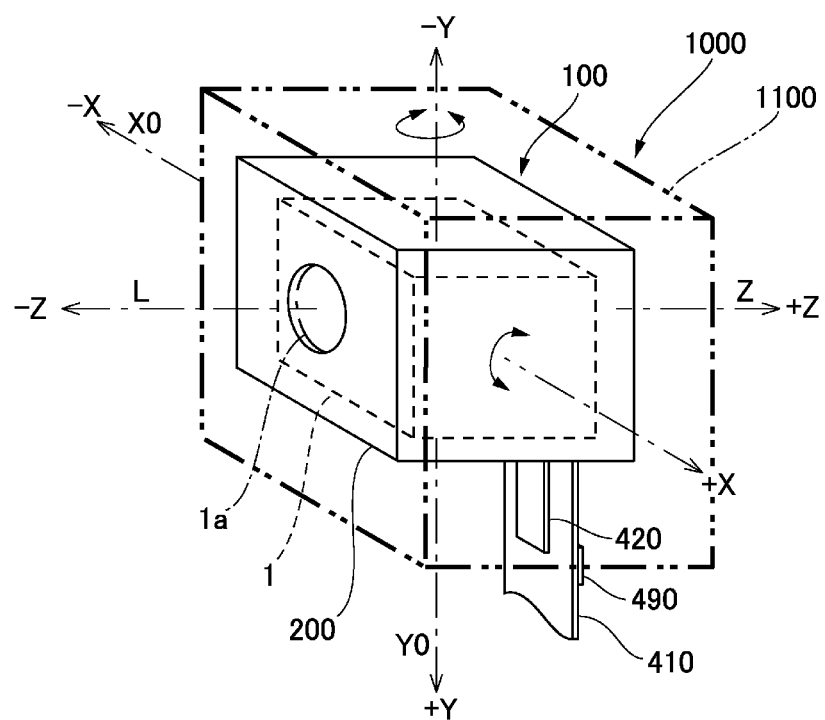
FIG. 1 is an explanatory view schematically showing a state in which an optical unit with a shake correcting function in accordance with a first embodiment of the present invention is mounted on an optical device such as a cell phone.
Figure 2A:
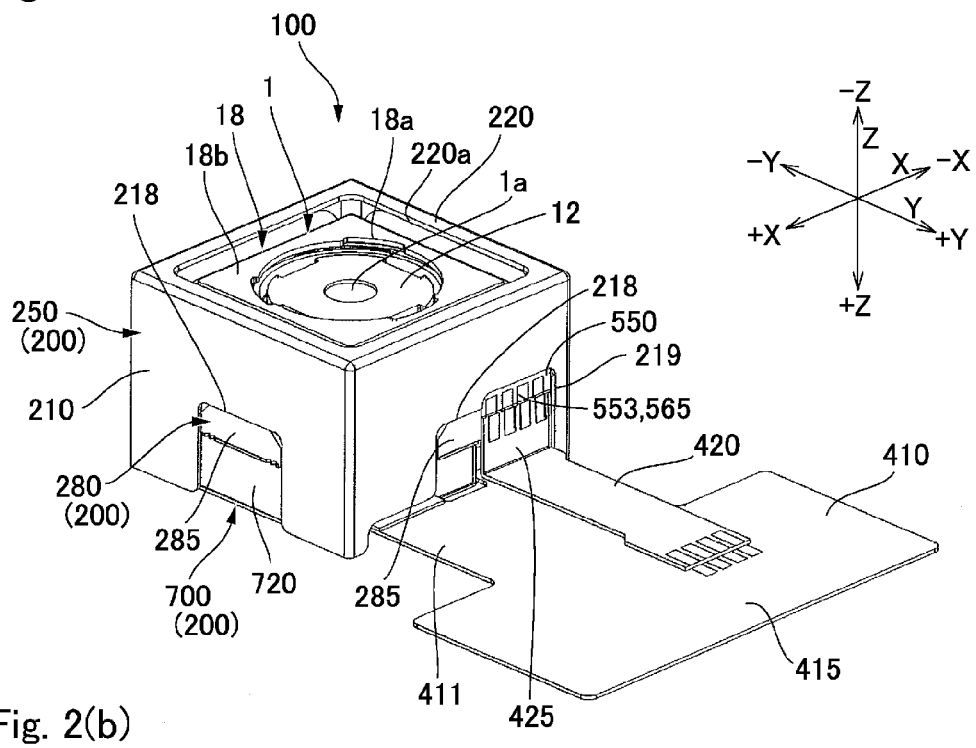
FIGS. 2(a) and 2(b) are perspective views showing an outward appearance of the optical unit with a shake correcting function and the like in accordance with the first embodiment of the present invention.
Figure 2B:
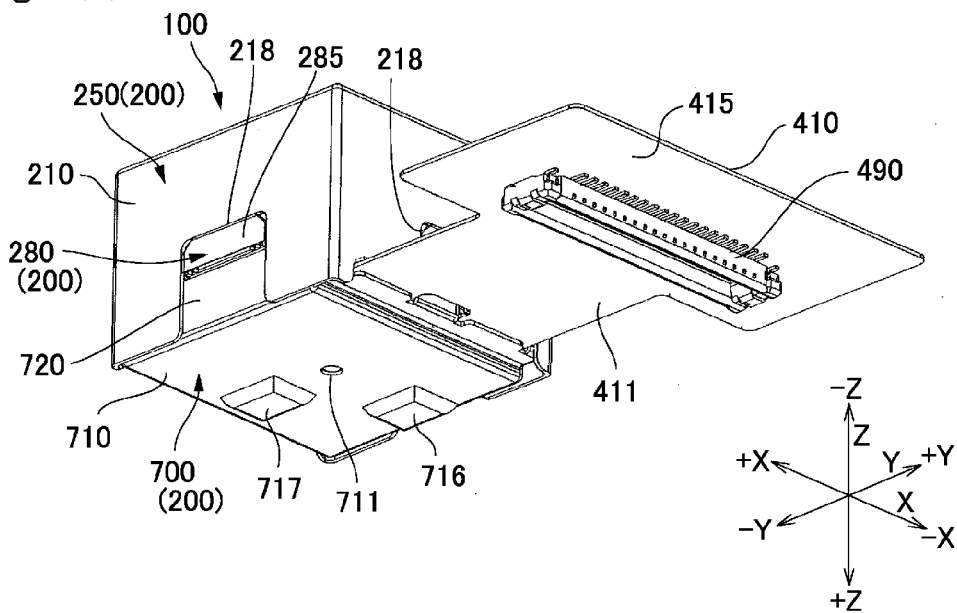

FIG. 1 is an explanatory view schematically showing a state in which an optical unit with a shake correcting function in accordance with a first embodiment of the present invention is mounted on an optical device such as a cell phone. FIGS. 2(a) and 2(b) are perspective views showing an outward appearance of the optical unit with a shake correcting function and the like in accordance with the first embodiment of the present invention. FIG. 2(a) is a perspective view showing the optical unit which is viewed from an object side and FIG. 2(b) is a perspective view showing the optical unit which is viewed from an opposite side to the object side.

An optical unit 100 (optical unit with a shake correcting function) shown in FIG. 1 is a thin camera used in an optical device 1000 such as a cell phone with a camera and is mounted in a supported state by a chassis 1100 (device main body) of the optical device 1000. In the optical unit 100, when a shake such as a hand shake is occurred in the optical device 1000 at the time of photographing, disturbance occurs in a photographed image. Therefore, in the optical unit 100 in this embodiment, as described below, a movable body 3 including a photographing unit 1 is supported within a fixed body 200 so as to be capable of being swung and the optical unit 100 is provided with a shake correction drive mechanism (not shown in FIG. 1) which swings the photographing unit 1 on the basis of a detection result for a hand shake by a gyroscope (not shown) mounted on the optical unit 100 or a gyroscope (not shown) mounted on a main body side of the optical device 1000.

As shown in FIG. 1 and FIGS. 2(a) and 2(b), flexible circuit boards 410 and 420 are extended out from the optical unit 100 for supplying power to the photographing unit 1 and the shake correction drive mechanism. The flexible circuit boards 410 and 420 are electrically connected with a host control section or the like which is provided in a main body of the optical device 1000 through a common connector 490 or the like. Further, the flexible circuit board 410 is also provided with a function for outputting a signal from the photographing unit 1. Therefore, the number of wiring lines in the flexible circuit board 410 is large and thus a relatively wide flexible circuit board 410 is used.

(Structure of Photographing Unit 1)

Figure 3:
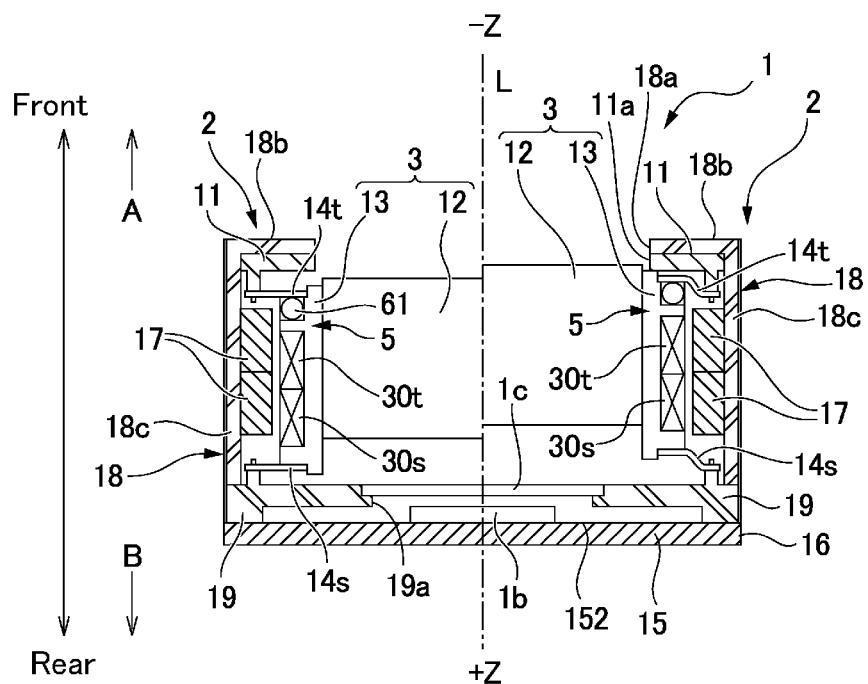
FIG. 3 is a cross-sectional view schematically showing a structure of a photographing unit 1 which is mounted on the optical unit with a shake correcting function in accordance with the first embodiment of the present invention.
Figure 4:
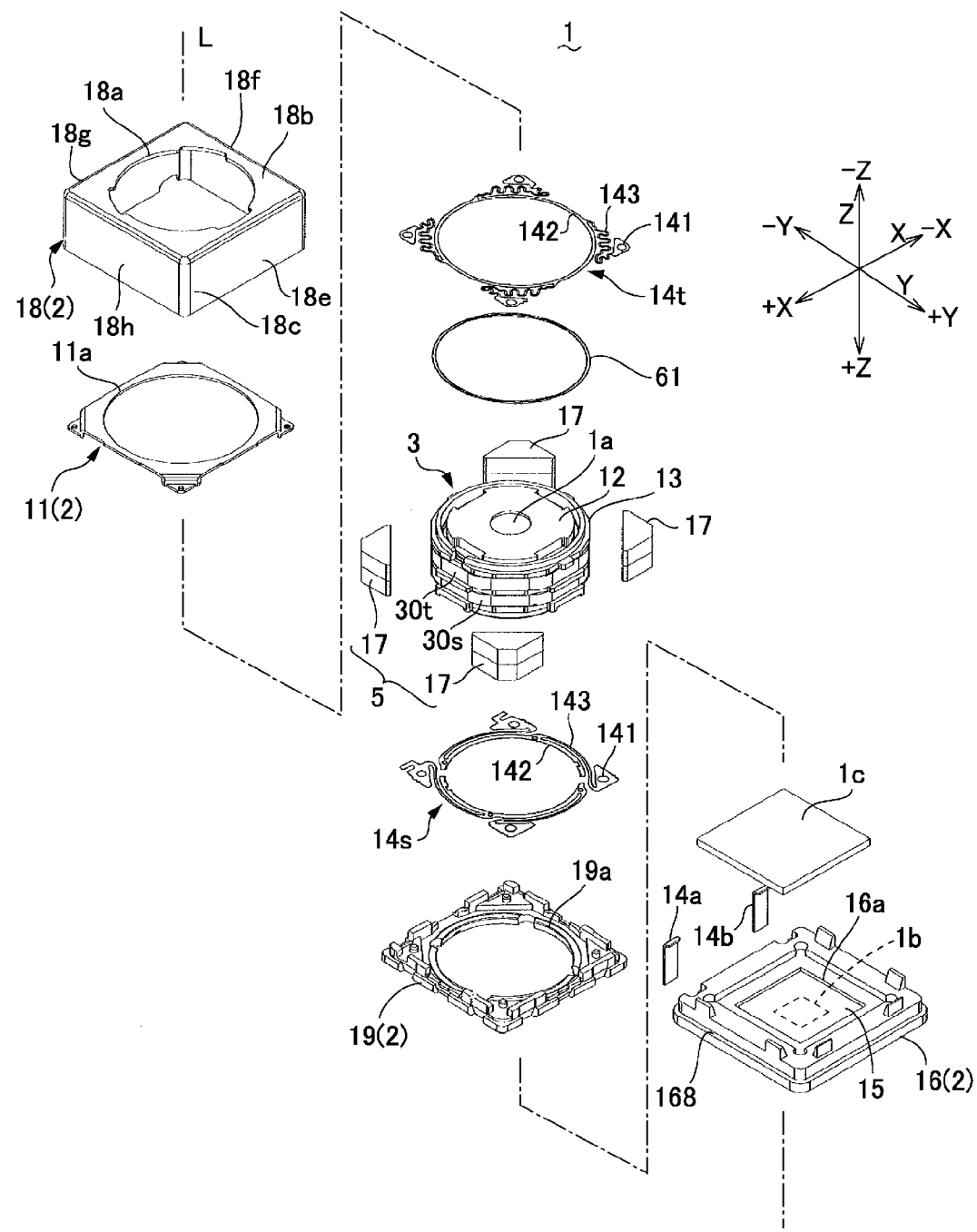
FIG. 4 is an exploded perspective view showing the photographing unit which is mounted on the optical unit with a shake correcting function in accordance with the first embodiment of the present invention.

FIG. 3 is a cross-sectional view schematically showing a structure of the photographing unit 1 which is mounted on the optical unit 100 with a shake correcting function in accordance with the first embodiment of the present invention. FIG. 4 is an exploded perspective view showing the photographing unit 1 which is mounted on the optical unit 100 with a shake correcting function in accordance with the first embodiment of the present invention.

As shown in FIGS. 3 and 4, the photographing unit 1 is, for example, an optical element unit which moves a plurality of lenses 1a as an optical element (see FIG. 1) in both directions, i.e., in an "A"-direction (front side) approaching an object to be photographed (object side) along a direction of the optical axis "L" and in a "B"-direction (rear side) approaching an opposite side (imaging element side/image side) to the object to be photographed. The photographing unit 1 is formed in a substantially rectangular prism shape. The photographing unit 1 generally includes a movable body 3 which holds optical elements such as a plurality of the lenses 1a (see FIG. 1) and a fixed diaphragm on its inner side, a magnetic drive mechanism 5 for moving the movable body 3 along an optical axis "L" direction, and a support body 2 on which the magnetic drive mechanism 5, the movable body 3 and the like are mounted. The movable body 3 is provided with a lens holder 12 in a cylindrical tube shape which holds the lenses 1a and the fixed diaphragm (not shown) and a coil holder 13 which holds the lens holder 12 on its inner side. Lens drive coils 30s and 30t structuring the lens drive mechanism 5 are held on an outer peripheral side face of the coil holder 13.

The support body 2 includes a spring holder 19 which holds a spring described below on an opposite side to an object side ("−Z" side), a circuit board holder 16 in a rectangular plate shape which positions a circuit board 15 on an opposite side to the object side ("−Z" side) with respect to the spring holder 19, a case 18 in a box shape which is fitted to the spring holder 19 from the object side, and a spacer 11 in a rectangular plate shape which is disposed on an inner side of the case 18. An imaging element 1b is mounted on a circuit board face 152 of the circuit board 15 which is directed to the object side. Further, a filter 1c such as an infrared filter is held on the spring holder 19. Incident windows 11a and 18a for taking light from an object to be photographed into the lenses 1a are respectively formed at the centers of the spacer 11 and the case 18. Further, windows 16a and 19a for guiding the incident light to the imaging element 1b are formed at the centers of the circuit board holder 16 and the spring holder 19.

The case 18 is made of a ferromagnetic plate such as a steel plate and functions as a yoke. Therefore, the case 18 structures an interlinkage magnetic field generating body together with lens drive magnets 17 described below for generating a magnetic field interlinking with the lens drive coils 30s and 30t. The interlinkage magnetic field generating body structures the lens drive mechanism 5 together with the lens drive coils 30s and 30t which are wound around an outer peripheral face of the coil holder 13.

The support body 2 and the movable body 3 are connected with each other through metal spring members 14s and 14t which are disposed at separated positions in the optical axis direction. In this embodiment, the spring member 14s is used on the imaging element 1b side and the spring member 14t is used on an object to be photographed side. Basic structures of the spring members 14s and 14t are similar to each other and each of the spring members 14s and 14t is provided with an outer peripheral side connecting part 141 which is held by the support body 2, a circular ring-shaped inner peripheral side connecting part 142 which is held by the movable body 3, and arm parts 143 having a thinner width which are connected with the outer peripheral side connecting part 141 and the inner peripheral side connecting part 142. The outer peripheral side connecting part 141 of the spring member 14s on the imaging element 1b side is held by the spring holder 19 and its inner peripheral side connecting part 142 is connected with an imaging element side end part of the coil holder 13 of the movable body 3. The arm part 143 of the spring member 14s is extended in a circular arc shape in a circumferential direction. The outer peripheral side connecting part 141 of the spring member 14t on the object side is held by the spacer 11 and its inner peripheral side connecting part 142 is connected with an object side end part of the coil holder 13 of the movable body 3. The arm part 143 of the spring member 14t is extended in a circular arc shape in the circumferential direction while meandering in a radial direction. In this manner, the movable body 3 is supported by the support body 2 through the spring members 14s and 14t so as to be movable in the direction of the optical axis. Each of the spring members 14s and 14t is made of nonmagnetic metal such as beryllium copper or nonmagnetic SUS steel material and is formed by performing press working or etching processing using photo lithography technique on a thin plate having a certain thickness. The spring member 14s is divided into two spring pieces and respective coil ends of the lens drive coils 30s and 30t are connected with the respective spring pieces. Further, two spring pieces of the spring member 14s are connected with terminals 14a and 14b and thus the spring member 14s functions also as a power supply member for the lens drive coils 30s and 30t.

A ring-shaped magnetic piece 61 is held at an object side end part of the coil holder 13 and the position of the magnetic piece 61 is held at a position on the object side with respect to the lens drive magnets 17. Therefore, the magnetic piece 61 applies an urging force in the direction of the optical axis "L" to the movable body 3 by an attraction force acted between the lens drive magnets 17 and the magnetic piece 61. Accordingly, at a non-energization time (home position), the lens holder 12 is set stationary on the imaging element 1b side by the attraction force between the lens drive magnets 17 and the magnetic piece 61. Further, the magnetic piece 61 acts as a yoke and thus a leakage flux from a magnetic path structured between the lens drive magnets 17 and the lens drive coils 30s and 30t can be reduced. The magnetic piece 61 may be formed in a bar shaped magnetic body or a spherical shaped magnetic body. In a case that the magnetic piece 61 is formed in a ring shape, when the lens holder 12 is to be moved in the optical axis direction, an attraction force acted between the lens drive magnets 17 and the magnetic piece 61 becomes isotropic. In addition, at the time of energization to the lens drive coils 30s and 30t, the magnetic piece 61 is moved in a direction separated from the lens drive magnets 17 and thus an unnecessary force pressing the lens holder 12 to the imaging element 1b side may not act. Therefore, the lens holder 12 can be moved in the optical axis direction with small electric power.

In the photographing unit 1 in this embodiment, when viewed in the direction of the optical axis "L", the lens 1a (see FIG. 1) is formed in a circular shape but the case 18 used in the support body 2 is formed in a rectangular box shape. Therefore, the case 18 is provided with a rectangular tube-shaped body part 18c and an upper plate part 18b formed with the incident window 18a is provided on an upper face side of the rectangular tube-shaped body part 18c. The lens drive magnets 17 are fixed to inner side face parts corresponding to the corners of a quadrangle of the rectangular tube-shaped body part 18c and the lens drive magnets 17 are respectively comprised of a triangular prism-shaped permanent magnet. Each of four lens drive magnets 17 is divided into two pieces in the direction of the optical axis and is magnetized so that a magnetic pole of its inner face and a magnetic pole of its outer face are different from each other. Therefore, winding directions of the two lens drive coils 30s and 30t around the coil holder 13 are opposite to each other. The movable body 3 which is structured as described above is disposed on an inner side of the case 18. As a result, the lens drive coils 30s and 30t respectively face the lens drive magnets 17 which are fixed to the inner face of the rectangular tube-shaped body part 18c of the case 18 to structure the lens drive mechanism 5.

In the photographing unit 1 structured as described above, the movable body 3 is normally located on the imaging element side (one side in the "Z"-axis direction) and, in this state, when an electric current is supplied to the lens drive coils 30s and 30t in a predetermined direction, an electro-magnetic force directing to the object side (the other side in the "Z"-axis direction) is applied to the respective lens drive coils 30s and 30t. Therefore, the movable body 3 to which the lens drive coils 30s and 30t are fixed begins to move to the object side (front side). In this case, an elastic force restricting movement of the movable body 3 is generated between the spring member 14t and the front end of the movable body 3 and between the spring member 14s and the rear end of the movable body 3. Therefore, when the electro-magnetic force for moving the movable body 3 to the front side and the elastic force for restricting the movement of the movable body 3 are balanced with each other, the movable body 3 is stopped. In this case, when an amount of an electric current supplied to the lens drive coils 30s and 30t is adjusted depending on the elastic force acting on the movable body 3 by the spring members 14s and 14t, the movable body 3 can be stopped at a desired position.

(Structure of Optical Unit 100)

Figure 5A:
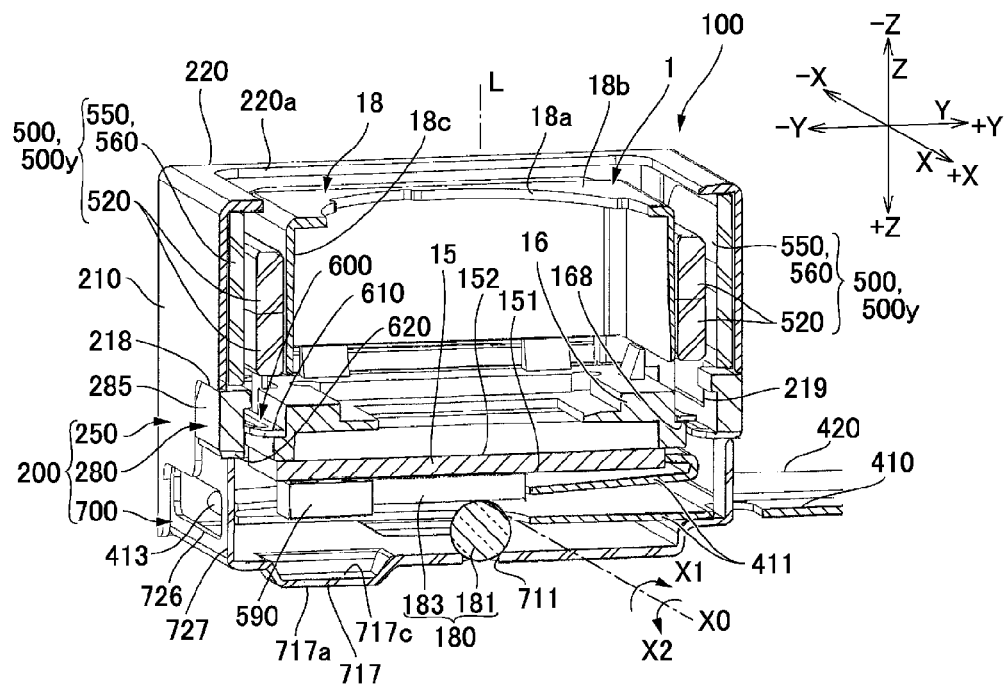
FIGS. 5(a) and 5(b) are cross-sectional views showing an internal structure of the optical unit with a shake correcting function in accordance with the first embodiment of the present invention.
Figure 5B:
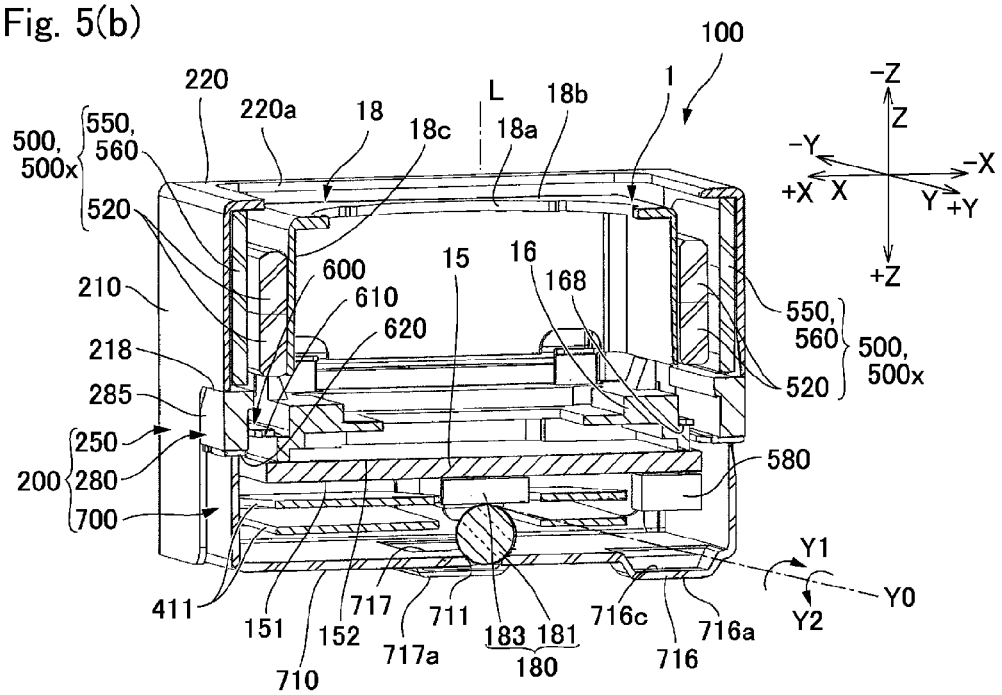
Figure 6:
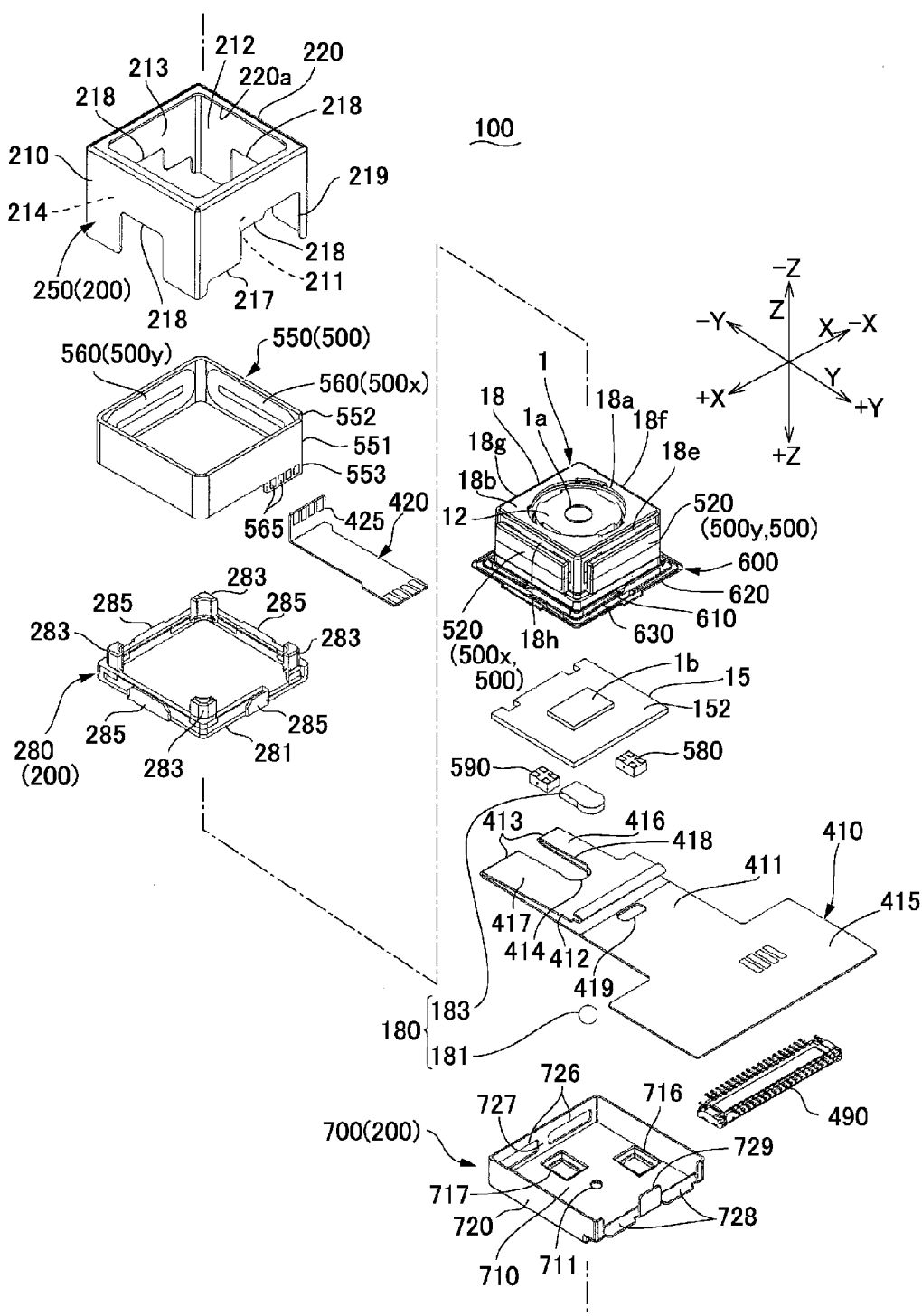
FIG. 6 is an exploded perspective view showing the optical unit with a shake correcting function in accordance with the first embodiment of the present invention which is viewed from an object to be photographed side.
Figure 7:
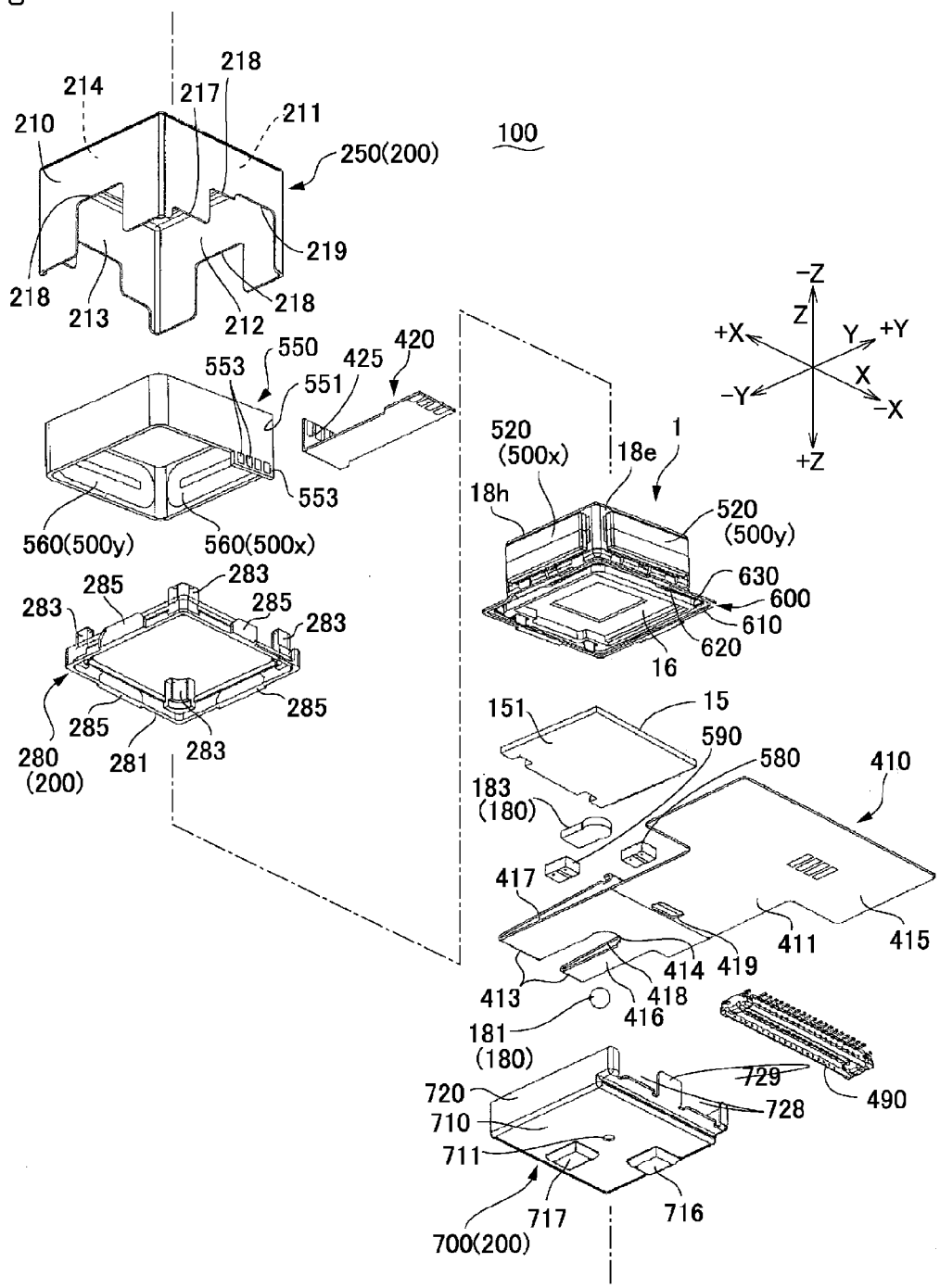
FIG. 7 is an exploded perspective view showing the optical unit with a shake correcting function in accordance with the first embodiment of the present invention which is viewed from an opposite side to an object to be photographed side.

FIGS. 5(a) and 5(b) are cross-sectional views showing an internal structure of the optical unit 100 with a shake correcting function in accordance with the first embodiment of the present invention. FIG. 5(a) is a "YZ" cross-sectional view of the optical unit 100 and FIG. 5(b) is an "XZ" cross-sectional view of the optical unit 100. In FIGS. 5(a) and 5(b), only the case 18, the circuit board holder 16 and the circuit board 15 of the photographing unit 1 are shown and other members are not shown. FIG. 6 is an exploded perspective view showing the optical unit 100 with a shake correcting function in accordance with the first embodiment of the present invention which is viewed from an object to be photographed side. FIG. 7 is an exploded perspective view showing the optical unit 100 with a shake correcting function in accordance with the first embodiment of the present invention which is viewed from an opposite side to an object to be photographed side.

In FIGS. 5(a) and 5(b), and FIGS. 6 and 7, the optical unit 100 includes a fixed body 200, the photographing unit 1, a spring member 600 through which the photographing unit 1 is supported by the fixed body 200 so as to be capable of displacing, and a movable module drive mechanism 500 which generates a magnetic drive force for relatively displacing the photographing unit 1 with respect to the fixed body 200 between the photographing unit 1 and the fixed body 200. An outer peripheral portion of the photographing unit 1 is structured of the case 18 which is used in the support body 2 in the photographing unit 1.

The fixed body 200 is provided with an upper cover 250, a spacer 280 and a lower cover 700 and the upper cover 250 is provided with a rectangular tube-shaped body part 210 which surrounds the photographing unit 1 and an end plate part 220 which closes an opening part on the object side of the rectangular tube-shaped body part 210. The end plate part 220 is formed with a window 220a through which light from an object to be photographed is incident. In the upper cover 250, an end part on the opposite side ("+Z" side) to the object side (side to which the optical axis is extended) of the rectangular tube-shaped body part 210 is formed to be opened. Further, cut-out portions 219 are formed at two positions of the rectangular tube-shaped body part 210 which are faced in the "Y"-axis direction. The cut-out portion 219 on one side "+Y" in the "Y"-axis direction is utilized when the flexible circuit board 420 is to be connected with terminal parts of the sheet-shaped coil 550 described below. Further, cut-out portions 218 which are utilized for engaging with the spacer 280 described below are formed in four faces of the rectangular tube-shaped body part 210. Two of the four cut-out portions 218 located in the "Y"-axis direction are connected with the cut-out portion 219 to structure one cut-out portion. Further, a cut-out portion 217 connected with the cut-out portion 218 is formed at two positions facing in the "Y"-axis direction on the lower end side of the rectangular tube-shaped body part 210. The cut-out portion 217 on one side "+Y" in the "Y"-axis direction is utilized for extending the flexible circuit board 410 to an outer side.

The spacer 280 is provided with a frame part 281 in a quadrangular shape, which is sandwiched between the rectangular tube-shaped body part 210 of the upper cover 250 and the lower cover 700, columnar shaped parts 283 which are protruded toward an object side from corner portions of the frame part 281, and engaging protruded parts 285 which are slightly protruded from side portions of the frame part 281 toward outer sides. When the upper cover 250 is fitted to the spacer 280, the engaging protruded part 285 is engaged with the cut-out portion 218 which is cut off in a quadrangular shape in the rectangular tube-shaped body part 210 of the upper cover 250 and, as a result, positioning of the spacer 280 to the upper cover 250 is performed.

The lower cover 700 is a press-worked product made of a metal plate and is provided with a bottom plate part 710 in a substantially rectangular shape and four side plate parts 720 which are stood up toward an object side from an outer circumferential edge of the bottom plate part 710. When the spacer 280 and the upper cover 250 are superposed on the lower cover 700, the frame part 281 of the spacer 280 is sandwiched between the side plate part 720 and the rectangular tube-shaped body part 210 of the upper cover 250.

The side plate part 720 located on one side "+Y" in the "Y"-axis direction is formed with a cut-out portion 728 and a part of the side plate part 720 is left as a plate-shaped projection 729 at a center part of the cut-out portion 728. Further, a window-shaped cut-out portion 726 is formed in the side plate part 720 located on the other side "−Y" in the "Y"-axis direction and a part of the side plate part 720 is left as a crosspiece part 727 at a center part of the cut-out portion 726. The cut-out portion 728 is, as described below, utilized to extend the flexible circuit board 410 to an outer side and the cut-out portion 726 is utilized to prevent a folded-back portion 413 from interfering with the side plate part 720 of the lower cover 700.

A bottom plate part 710 of the lower cover 700 is formed with a hole 711 at its center position and recessed parts 716 and 717 which are recessed in a rectangular shape are formed at a position adjacent to the hole 711 on the other side "−X" in the "X"-axis direction and a position adjacent to the hole 711 on the other side in the "Y"-axis direction. As described below, inner faces of the bottom parts 716a and 717a of the recessed parts 716 and 717 are a substantially mirror surface and the bottom parts 716a and 717a are utilized as reflection faces for a first photo reflector 580 and a second photo reflector 590 which are mounted on a circuit board face 151 of the circuit board 15 on an opposite side to an object side.

The lower cover 700 is formed of a metal member which is non-magnetized by heat treatment. Specifically, the lower cover 700 is a metal member in which metal material such as "SUS 304" is performed with a bending work or a drawing work in a predetermined shape. When a bending work or a drawing work is performed on "SUS 304" or the like, a part of austenite is transferred to martensite to provide with a magnetic property. However, in this embodiment, heat treatment is performed on the lower cover 700 after a bending work or a drawing work. Therefore, when the optical unit 100 is to be assembled, attraction between the permanent magnets 520 and the lower cover 700 is prevented. Further, when heat treatment is performed on metal material such as "SUS 304", its reflectivity becomes higher and thus the lower cover 700 is provided with a sufficient reflectivity for utilizing as a reflection surface for the first photo reflector 580 and the second photo reflector 590.

(Structure of Swing Support Point)

On one side "+Z" in the "Z"-axis (opposite side to the object side) with respect to the photographing unit 1, a swing support point 180 when the photographing unit 1 is to be swung is provided between the photographing unit 1 and the lower cover 700 of the fixed body 200. The photographing unit 1 is urged toward the lower cover 700 by the spring member 600 through the swing support point 180. In this embodiment, the swing support point 180 is structured of a steel ball 181, which is positioned by a hole 711 formed in the bottom plate part 710 of the lower cover 700, and a support plate 183 which is fixed to a circuit board face 151 of the circuit board 15. The photographing unit 1 is capable of swinging with an abutted position of the steel ball 181 with the support plate 183 as a swing center.

(Structure of Spring Member 600)

The spring member 600 is a plate-shaped spring member which is provided with a fixed side connecting part 620 sandwiched between the side plate part 720 of the lower cover 700 and the frame part 281 of the spacer 280 in the fixed body 200, a movable side connecting part 610 connected with the photographing unit 1, and a plurality of arm parts 630 which are extended between the movable side connecting part 610 and the fixed side connecting part 620. Both ends of the arm part 630 are respectively connected with the movable side connecting part 610 and the fixed side connecting part 620. In this embodiment, the movable side connecting part 610 of the spring member 600 is fixed to a stepped part 168 which is formed on an outer peripheral side of a circuit board holder 16 on a rear end side of the photographing unit 1. The spring member 600 is made of nonmagnetic metal such as beryllium copper or nonmagnetic SUS steel material and is formed by performing a press working or etching processing using a photo lithography technique on a thin plate having a certain thickness.

In this embodiment, when the photographing unit 1 is disposed on an object side with respect to the steel ball 181 in a state that the fixed side connecting part 620 of the spring member 600 is sandwiched between the side plate part 720 of the lower cover 700 and the frame part 281 of the spacer 280 in the fixed body 200, the photographing unit 1 becomes in a state that the photographing unit 1 is pushed up to an object side by the steel ball 181. Therefore, the movable side connecting part 610 of the spring member 600 is set in a state that the movable side connecting part 610 is pushed to the object side with respect to the fixed side connecting part 620 and thus the arm parts 630 of the spring member 600 urges the photographing unit 1 to an opposite side to the object side. Accordingly, the photographing unit 1 is set in a state that the photographing unit 1 is urged toward the bottom plate part 710 of the lower cover 700 through the swing support point 180 by the spring member 600 and thus the photographing unit 1 is set in a supported state by the fixed body 200 so as to be capable of being swung through the swing support point 180.

(Structure of Shake Correction Drive Mechanism)

As shown in FIG. 5(a) through FIG. 7, in the optical unit 100 in this embodiment, the shake correction drive mechanism 500 is structured of a coil part 560 and a permanent magnet 520 for generating a magnetic field interlinking with the coil part 560. Specifically, four outer faces 18e, 18f, 18g and 18h of the rectangular tube-shaped body part 18c of the case 18 of the photographing unit 1 are fixed with a flat plate-shaped permanent magnet 520 and the coil part 560 is disposed on inner faces 211, 212, 213 and 214 of the rectangular tube-shaped body part 210 of the upper cover 250. The permanent magnet 520 is magnetized so that the pole of its outer side and the pole of its inner side are different from each other. Further, the permanent magnet 520 is comprised of two magnet pieces disposed in the optical axis "L" direction and the magnet pieces are magnetized so that the poles of faces oppositely disposed to the coil part 560 are different from each other in the optical axis direction. Further, the coil part 560 is formed in a quadrangular frame shape and its upper and lower long side portions are utilized as an effective side.

In the permanent magnets 520 and the coil parts 560, the permanent magnets 520 and the coil parts 560 disposed at two positions so as to interpose the photographing unit 1 from both sides in the "Y"-axis direction structure a "Y"-side shake correction drive mechanism 500y and, as shown by the arrows "X1" and "X2" in FIG. 5(a), the photographing unit 1 is swung with the axial line "X0" extending in the "X"-axis direction passing through the swing support point 180 as a swing center. Further, the permanent magnets 520 and the coil parts 560 disposed at two positions so as to interpose the photographing unit 1 from both sides in the "X"-axis direction structure an "X"-side shake correction drive mechanism 500x and, as shown by the arrows "Y1" and "Y2" in FIG. 5(b), the photographing unit 1 is swung with the axial line "Y0" extending in the "Y"-axis direction passing through the swing support point 180 as a swing center.

In order to structure the "Y"-side shake correction drive mechanism 500y and the "X"-side shake correction drive mechanism 500x, in this embodiment, a sheet-shaped coil 550 is used so as to be extended along the four inner faces 211, 212, 213 and 214 of the upper cover 250 and four coil parts 560 are integrally formed in the sheet-shaped coil 550 with a predetermined distance therebetween. Further, when developed, the sheet-shaped coil 550 is provided with a shape extended in a belt shape and is fixed to the four inner faces 211, 212, 213 and 214 of the upper cover 250 by a method such as surface bonding in a state that the sheet-shaped coil 550 is bent along the inner faces 211, 212, 213 and 214 of the upper cover 250. In this state, both end parts 551 and 552 of the sheet-shaped coil 550 are brought close to each other through a slit 555.

The sheet-shaped coil 550 is structured so that the coil part 560 made of a minute copper wiring line is formed on a printed circuit board by utilizing an electric conduction wiring technique. A plurality of copper wiring layers (coil part 560) is formed in multi-layer through an insulation film. Further, the surface of the copper wiring line (coil part 560) is covered with an insulation film. For example, an FP coil (fine pattern coil (registered mark)) made by ASAHI KASEI ELECTRONICS CO., LTD. may be used as the sheet-shaped coil 550.

In this embodiment, an end part 551 of the sheet-shaped coil 550 is formed with a protruded part 553 which is protruded in a rectangular shape to an opposite side to the object side and the protruded part 553 is formed with a plurality of terminal parts 565 which are made of electrically conducting layers extended from the four coil parts 560. In this embodiment, the terminal parts 565 are disposed on an outer side of the sheet-shaped coil 550 which is opposite to the inner side facing the permanent magnet 520. Further, as shown in FIGS. 2(a) and 2(b), and FIGS. 6 and 7, the cut-out part 219 is formed in the portion of the upper cover 250 which is overlapped with the terminal parts 565. Therefore, since the terminal parts 565 (protruded part 553) of the sheet-shaped coil 550 are exposed to the outer side, the sheet-shaped coil 550 and an end part 425 of the flexible circuit board 420 which is bent toward the direction of the optical axis "L" are electrically connected with each other in the cut-out part 219 by soldering or the like.

In the optical unit 100 which is structured as described above, the photographing unit 1 is supported by the fixed body 200 in a state that the photographing unit 1 is capable of swinging through the swing support point 180. Therefore, when a large force is applied from the outside to swing the photographing unit 1 largely, the arm parts 630 of the spring member 600 may be plastically deformed. In this embodiment, the sheet-shaped coil 550 and the permanent magnet 520 are faced each other through a narrow gap space. Further, in a case of the sheet-shaped coil 550, different from an air-core coil, a wound coil is not loosened even when the coil is abutted with the permanent magnet 520. Therefore, in the optical unit 100 in this embodiment, moving ranges of the photographing unit 1 in the "X"-axis direction and the "Y"-axis direction intersecting with the optical axis "L" are restricted by abutting of the sheet-shaped coil 550 with the permanent magnet 520 and thus another stopper mechanism for preventing the swing of the photographing unit 1 is not provided.

Further, in this embodiment, since the sheet-shaped coil 550 is used, in comparison with a case that a discrete air-core coil is separately used, a distance between the photographing unit 1 and the fixed body 200 can be narrowed and thus the size of the optical unit 100 can be reduced. Further, in a case of the sheet-shaped coil 550, a plurality of coil parts 560 is integrally formed with the terminal parts 565 and thus, even when the coil parts 560 are disposed at plural positions around the optical axis "L", it is sufficient that the sheet-shaped coil 550 is extended around the optical axis "L". Therefore, different from a case that a discrete air-core coil is separately used, discrete air-core coils are not required to be disposed at plural positions around the optical axis "L" and the respective air-core coils are not required to be electrically connected and thus, according to this embodiment, assembly man-hours are reduced. Further, the terminal parts 565 of the sheet-shaped coil 550 are disposed so as to face the outer side which is an opposite side to a side facing the permanent magnet 520 and thus electrical connection with the coil parts 560, in other words, connection of the flexible circuit board 420 with the terminal parts 565 can be performed easily.

(Shake Correcting Operation)

In the optical unit 100 in this embodiment, when the optical device 1000 shown in FIG. 1 is shaken, the shake is detected by a gyroscope and the host control section controls the shake correction drive mechanism 500 based on a detection result by the gyroscope. In other words, a drive current for cancelling the shake which is detected by the gyroscope is supplied to the coil parts 560 of the sheet-shaped coil body 550 through the flexible circuit board 410 and the flexible circuit board 420. As a result, the "X"-side shake correction drive mechanism 500x swings the photographing unit 1 around the "Y"-axis with the swing support point 180 as a swing center. Further, the "Y"-side shake correction drive mechanism 500y swings the photographing unit 1 around the "X"-axis with the swing support point 180 as the swing center. Further, when the swing around the "X"-axis and the swing around the "Y"-axis of the photographing unit 1 are combined with each other, the photographing unit 1 is displaced over the entire "XY" plane. Accordingly, all shakes occurred in the optical unit 100 can be corrected surely. When the photographing unit 1 is to be driven, the displacement of the photographing unit 1 is monitored by the first photo reflector 580 and the second photo reflector 590 as described below with reference to FIGS. 8(a), 8(b), 9(a), 9(b) and 9(c).

(Structure of Flexible Circuit Board 410)

In the optical unit 100 in this embodiment, one end part of the flexible circuit board 410 is connected with the circuit board 15 of the photographing unit 1. In a case that the photographing unit 1 is to be swung, when the flexible circuit board 410 applies a load to the photographing unit 1, an appropriate swing of the photographing unit 1 may be obstructed.

The main body portion 415 of the flexible circuit board 410 which is located on an outer side of the optical unit 100 is formed in a wide width so as to be capable of mounting a connector 490 and being connected with the flexible circuit board 420. However, in order to prevent the above-mentioned problem, a portion of the flexible circuit board 410 which is located on an inner side of the optical unit 100 is formed in two strip-shaped portions 411 whose width dimension is narrower than the main body portion 415. Further, the strip-shaped portion 411 is extended from one side "+Y" in the "Y"-axis direction toward the other side "−Y" and then, the strip-shaped portion 411 is folded back toward the one side "+Y" and, after that, an end part of the strip-shaped portion 411 is folded back along an edge of the circuit board 15 so as to be faced toward a circuit board face on the object side of the circuit board 15 and fixed. Therefore, since the flexible circuit board 410 is provided with the folded-back portion 413 between the main body portion 415 disposed on the outer side and the portion fixed to the circuit board 15 and thus its dimension is long. Accordingly, the strip-shaped portion of the flexible circuit board 410 is capable of following a shake of the photographing unit 1 smoothly and thus a large load is not applied to the photographing unit 1.

Further, the strip-shaped portion 411 of the flexible circuit board 410 is formed at a midway portion in its length direction with a slit 418 which is extended along an extended direction ("Y"-axis direction) of the strip-shaped portion 411 and the midway portion of the strip-shaped portion 411 is divided into two thinner width portions 416 and 417 in a widthwise direction. Therefore, the rigidity of the strip-shaped portion 411 is relaxed. Accordingly, the strip-shaped portion of the flexible circuit board 410 is capable of following a shake of the photographing unit 1 smoothly and thus a large load is not applied to the photographing unit 1.

In this embodiment, the strip-shaped portion 411 of the flexible circuit board 420 is superposed on the photographing unit 1 in the optical axis "L" direction. However, the portion of the strip-shaped portion 411 which is superposed on the swing support point 180 is formed with a circular hole 414 connected with the slit 418. Therefore, even when the strip-shaped portion 411 of the flexible circuit board 420 is disposed at a position superposed on the photographing unit 1 in the optical axis "L" direction, the swing support point 180 is provided without a problem.

Further, in the side plate part 720 of the lower cover 700, the side plate part 720 located on one side "+Y" in the "Y"-axis direction is formed with the cut-out portion 728 for extending the strip-shaped portion 411 of the flexible circuit board 420 and a part of the side plate part 720 is left as a plate-shaped projection 729 at the center part of the cut-out portion 728. However, a hole 419 in an elliptic shape is formed in a portion of the strip-shaped portion 411 of the flexible circuit board 420 which is superposed on the plate-shaped projection 729. Therefore, when the strip-shaped portion 411 of the flexible circuit board 420 is extended to an outer side through the cut-out portion 728 of the side plate part 720, the plate-shaped projection 729 is inserted into the hole 419 and thus the strip-shaped portion 411 of the flexible circuit board 420 is extended to the outer side without a problem. Further, since the plate-shaped projection 729 is fitted to the hole 419, positioning of the strip-shaped portion 411 of the flexible circuit board 420 can be performed.

In addition, in the side plate part 720 of the lower cover 700, the side plate part 720 located on the other side "−Y" in the "Y"-axis direction is formed with the cut-out portion 726 in a window shape. Therefore, even when the folded-back portion 413 of the flexible circuit board 410 is located in the vicinity of the side plate part 720, the folded-back portion 413 and the side plate part 720 are not interfered with each other. Accordingly, when the photographing unit 1 is swung, an unnecessary load due to interference of the folded-back portion 413 with the side plate part 720 is not applied to the photographing unit 1.

In addition, the folded-back portion 413 of the flexible circuit board 410 is located at the same height position as the swing center of the photographing unit 1 in the swing support point 180 (abutting position of the steel ball 181 with the support plate 183). Therefore, when the photographing unit 1 is swung, the displacement of the strip-shaped portion 411 is restrained small. Accordingly, affection of the flexible circuit board 410 applied to the photographing unit 1 is reduced and thus the photographing unit 1 is swung with a high degree of accuracy.

(Structure of Photo Reflector)

Figure 8A:
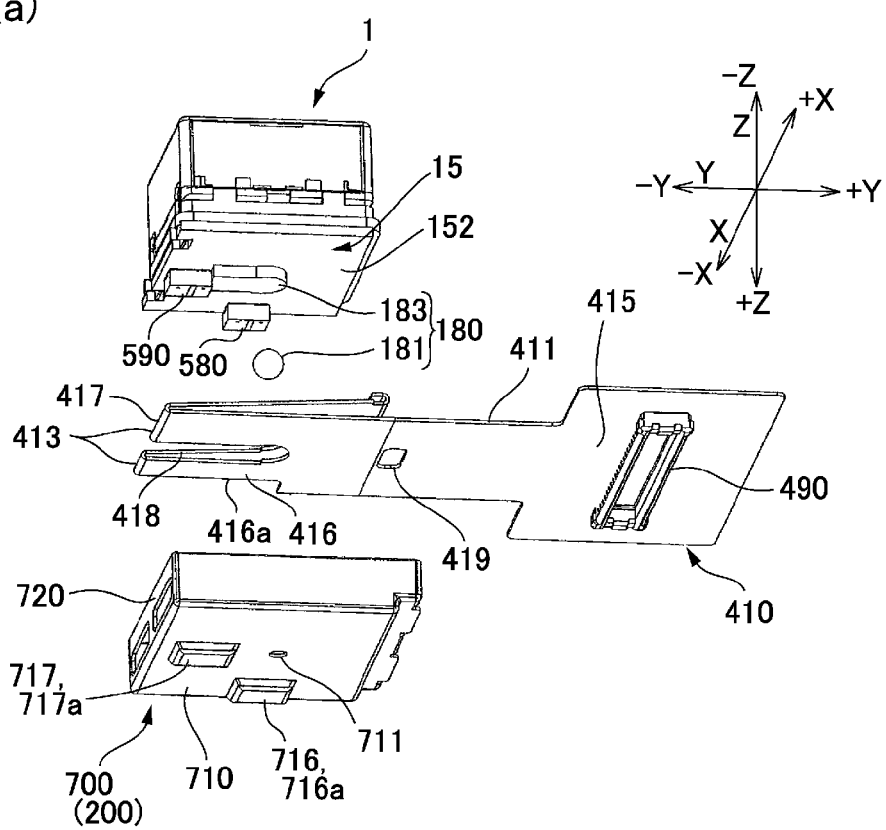
FIGS. 8(a) and 8(b) are explanatory views showing photo reflectors which are provided in the optical unit with a shake correcting function in accordance with the first embodiment of the present invention.
Figure 8B:
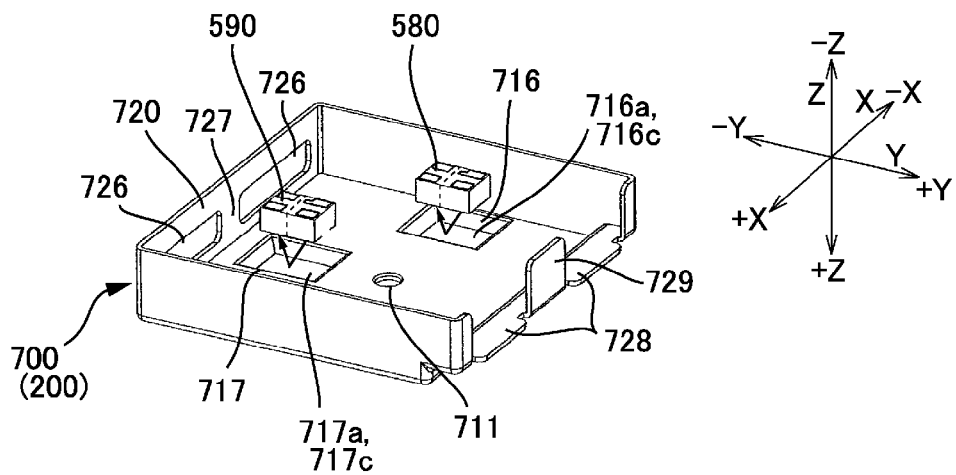
Figure 10:
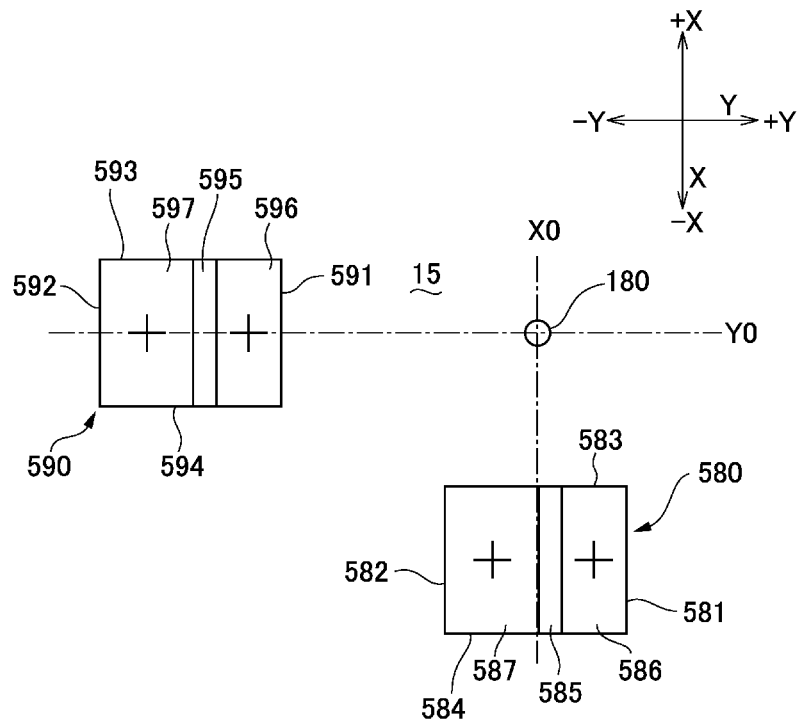
FIG. 10 is an explanatory view showing a layout of two photo reflectors in the optical unit with a shake correcting function in accordance with the first embodiment of the present invention.

FIGS. 8(a) and 8(b) are explanatory views showing photo reflectors which are provided in the optical unit 100 with a shake correcting function in accordance with the first embodiment of the present invention. FIG. 8(a) is an exploded perspective view showing an opposite side portion of the optical unit 100 to the object side and FIG. 8(b) is an explanatory view showing a positional relationship between the photo reflectors and reflection faces. FIGS. 9(a), 9(b) and 9(c) are explanatory views showing a positional relationship between photo reflectors and a flexible circuit board in the optical unit 100 with a shake correcting function in accordance with the first embodiment of the present invention. FIG. 9(a) is a bottom view showing a positional relationship between reflection parts of the lower cover 700 and the swing support point, FIG. 9(b) is a bottom view showing a positional relationship between the strip-shaped portion 411 of the flexible circuit board 410 and a photo reflector (a first photo reflector 580 and a second photo reflector 590), and FIG. 9(c) is a bottom view showing a positional relationship between the photo reflector and the swing support point. FIG. 10 is an explanatory view showing a layout of two photo reflectors in the optical unit 100 with a shake correcting function in accordance with the first embodiment of the present invention. In FIGS. 9(b) and 9(c), a light emission center and a light reception center of a photo reflector is indicated with a small circle and, in FIG. 10, a light emission center and a light reception center of a photo reflector is indicated with a "+" mark.

As shown in FIG. 5(a) through FIG. 9(c), in the optical unit 100 with a shake correcting function in this embodiment, the swing support point 180 is structured between the circuit board 15 which structures the bottom part of the photographing unit 1 and the lower cover 700 of the fixed body 200 and a first photo reflector 580 and a second photo reflector 590 are mounted on the circuit board face 151 of the circuit board 15 facing the lower cover 700. Further, two recessed parts 716 and 717 are formed in the bottom plate part 710 of the lower cover 700 and inner faces of the bottom parts 716a and 717a of the recessed parts 716 and 717 are a first reflection part 716c and a second reflection part 717c for the first photo reflector 580 and the second photo reflector 590.

As shown in FIGS. 9(a), 9(b) and 9(c) and FIG. 10, each of the first photo reflector 580 and the second photo reflector 590 is formed in a rectangular planar shape when viewed in the optical axis "L" direction and, as shown in FIG. 10, is provided with short sides 581, 582, 591 and 592 and long sides 583, 584, 593 and 594. Further, the first photo reflector 580 and the second photo reflector 590 are respectively provided with light emitting parts 586 and 596 at end parts on one side in the longitudinal direction and light receiving parts 587 and 597 at end parts on the other side in the longitudinal direction. Further, in the first photo reflector 580 and the second photo reflector 590, light intercepting parts 585 and 595 are formed between the light emitting parts 586 and 596 and the light receiving parts 587 and 597.

In this embodiment, the first photo reflector 580 is disposed at a position superposing the axial line "X0" described with reference to FIG. 5(b) in the optical axis "L" direction and the light emission center and the light reception center of the first photo reflector 580 are disposed at a linear symmetrical position with respect to the axial line "X0" in the direction perpendicular to the optical axis "L". Further, the second photo reflector 590 is disposed at a position superposing the axial line "Y0" described with reference to FIG. 5(a) in the optical axis "L" direction and the light emission center and the light reception center of the second photo reflector 590 are superposed on the axial line "Y0" in the optical axis "L" direction.

Further, the first photo reflector 580 and the second photo reflector 590 are disposed so that the long sides 583, 584, 593 and 594 are extended in the "Y"-axis direction and are parallel to the extended direction of the strip-shaped portion 411 of the flexible circuit board 410. Therefore, the short sides 581, 582, 591 and 592 of the first photo reflector 580 and the second photo reflector 590 are extended in the widthwise direction of the flexible circuit board 410. Therefore, even when the second photo reflector 590 is disposed at a position superposing on the slit 418 of the flexible circuit board 410 so that the second photo reflector 590 and the flexible circuit board 410 are not superposed on each other in the optical axis "L" direction, the width dimension of the slit 418 is not required to be increased. Further, in the strip-shaped portion 411 of the flexible circuit board 410, even in a case that a cut-out portion 416a is formed on an outer side edge portion of the thinner width portion 416 and the first photo reflector 580 is disposed at a position superposing on the cut-out portion 416a so that the first photo reflector 580 and the flexible circuit board 410 are disposed so as not to superpose on each other in the optical axis "L" direction, a width dimension of the cut-out portion 416a can be narrowed. Therefore, even when the strip-shaped portion 411 of the flexible circuit board 410 is extended in the "Y"-axis direction so as to avoid the position superposing on the first photo reflector 580 and the second photo reflector 590 in the optical axis "L" direction between the bottom part (circuit board 15) of the photographing unit 1 and the lower cover 700 of the fixed body 200, the width dimension of the strip-shaped portion 411 is comparatively large.

Further, the first photo reflector 580 and the second photo reflector 590 are disposed so that their light emitting parts 586 and 596 are located on one side "+Y" in the "Y"-axis direction and their light receiving parts 587 and 597 are located on the other side "-Y" in the "Y"-axis direction.

In the first photo reflector 580 and the second photo reflector 590 structured as described above, in a state that the circuit board 15 and the bottom plate part 710 of the lower cover 700 are parallel to each other, as shown in FIG. 8(b), light emitted from the light emitting part 586 of the photo reflector 580 is reflected by the first reflection part 716c to be received by the light receiving part 587 of the first photo reflector 580 with a high intensity and light emitted from the light emitting part 596 of the second photo reflector 590 is reflected by the second reflection part 717c to be received by the light receiving part 597 of the second photo reflector 590 with a high intensity. On the other hand, in a state that the circuit board 15 and the bottom plate part 710 of the lower cover 700 are not parallel to each other, light-receiving intensity in the light receiving part 587 of the first photo reflector 580 and light-receiving intensity in the light receiving part 597 of the second photo reflector 590 are lowered. Further, the light-receiving intensity in the light receiving part 587 of the first photo reflector 580 and the light-receiving intensity in the light receiving part 597 of the second photo reflector 590 are varied according to a direction of inclination of the photographing unit 1 with respect to the fixed body 200. Therefore, inclination of the photographing unit 1 is detected when the photographing unit 1 is swung around the axial lines "X0" and "Y0" for correcting a shake of hand in the optical unit 1. Accordingly, the swing of the photographing unit 1 by the shake correction drive mechanism 500 is appropriately performed by utilizing the detection result.

In this embodiment, the first photo reflector 580 is disposed at a position superposing on the axial line "X0" in the optical axis "L" direction and the second photo reflector 590 is disposed at a position superposing on the axial line "Y0" in the optical axis "L" direction. Therefore, displacement in the "X"-axis direction of the photographing unit 1 is monitored by the detection result of the first photo reflector 580 when the photographing unit 1 is turned around the axial line "Y0". Further, displacement in the "Y"-axis direction of the photographing unit 1 is monitored by the detection result of the second photo reflector 590 when the photographing unit 1 is turned around the axial line "X0". Therefore, displacement of the photographing unit 1 when turned around the axial line "X0" and displacement of the photographing unit 1 when turned around the axial line "Y0" are independently monitored and thus the turning around the axial line "X0" of the photographing unit 1 and the turning around the axial line "Y0" are controlled independently.

Principal Effects in this Embodiment

As described above, in the optical unit 100 in this embodiment, the shake correction drive mechanism 500 for swinging the photographing unit 1 as a movable module is provided and thus, when a shake such as a hand shake occurs in the optical unit 100, the photographing unit 1 can be swung to cancel the shake. Therefore, even when the optical unit 100 is shaken, inclination of the optical axis "L" can be corrected.

Further, in two axial lines "X0" and "Y0" when the photographing unit 1 is to be swung, the first photo reflector 580 is provided at the position superposing on the axial line "X0" in the optical axis "L" direction and the second photo reflector 590 is provided at the position superposing on the axial line "Y0" in the optical axis "L" direction. Therefore, shakes of the photographing unit 1 for the two axial lines "X0" and "Y0" are independently monitored and controlled by the first photo reflector 580 and the second photo reflector 590.

In addition, the shake correction drive mechanism 500 is provided between the outer peripheral face of the photographing unit 1 and the fixed body 200 (upper cover 250), and the first photo reflector 580 and the second photo reflector 590 are provided by utilizing a space between the bottom part (circuit board 15) of the photographing unit 1 and the fixed body 200 (lower cover 700) in which the swing support point 180 is provided. Therefore, even when the photo reflector (the first photo reflector 580 and the second photo reflector 590), the swing support point 180 and the shake correction drive mechanism 500 are provided for the photographing unit 1, the increase of size in the optical axis "L" direction and the direction intersecting the optical axis direction ("X"-axis direction and "Y"-axis direction) can be restrained.

Further, the flexible circuit board 410 is extended in the "Y"-axis direction between the bottom part of the photographing unit 1 and the fixed body 200 so as not to superpose on the first photo reflector 580 and the second photo reflector 590 in the optical axis "L" direction. However, the extended directions of the long sides 583, 584, 593 and 594 of the first photo reflector 580 and the second photo reflector 590 and the extended direction of the flexible circuit board 410 are parallel to each other. Therefore, the regions occupied by the first photo reflector 580 and the second photo reflector 590 are narrow in the widthwise direction ("X"-axis direction) of the flexible circuit board 410 and thus the flexible circuit board 410 are extended in a wide width dimension. Accordingly, a number of wiring patterns can be provided in the strip-shaped portion 411.

Further, the first photo reflector 580 and the second photo reflector 590 are provided in the bottom part of the photographing unit 1 and the first reflection part 716c and the second reflection part 717c for the first photo reflector 580 and the second photo reflector 590 are formed of inner bottom faces of the recessed parts 716 and 717 provided in the bottom plate part 710 of the lower cover 700 which face the bottom part of the photographing unit 1. According to this structure, the first reflection part 716c and the second reflection part 717c are recessed from their surrounding portions in a direction away from the bottom part of the photographing unit 1. Therefore, even in a case that a sufficient distance is required to secure between the first photo reflector 580 and the first reflection part 716c and between the second photo reflector 590 and the second reflection part 717c, a portion close to the bottom part of the photographing unit 1 can be provided in the lower cover 700 and thus the swing support point 180 can be provided at this close portion. Accordingly, the region where the swing support point 180 occupies is narrowed. In other words, when the lower cover 700 and the bottom part of the photographing unit 1 are set to be close to each other, a steel ball 181 having a small diameter may be used and thus the region where the swing support point 180 occupies can be narrowed. Accordingly, a space for disposing the first photo reflector 580 and the second photo reflector 590 can be secured between the bottom part of the photographing unit 1 and the lower cover 700. In accordance with an embodiment of the present invention, even in a case that a projection is utilized to structure the swing support point 180 instead of using the steel ball 181, when the lower cover 700 and the bottom part of the photographing unit 1 are set close to each other, the height dimension of the projection can be made small and thus the region where the projection occupies is narrowed. Therefore, a space for disposing the first photo reflector 580 and the second photo reflector 590 can be secured between the bottom part of the photographing unit 1 and the lower cover 700.

Further, the lower cover 700 is a metal member which is structured of metal material such as SUS304 on which a bending work or a drawing work are performed in a predetermined shape and is non-magnetized by heat treatment. Therefore, when the optical unit 100 is to be assembled, attraction and the like between the permanent magnet 520 and the lower cover 700 can be prevented. Further, when heat treatment is performed on metal material such as SUS304 and the like, its reflectivity becomes higher and thus the lower cover 700 is provided with a sufficient reflectivity for utilizing as a reflection face for the first photo reflector 580 and the second photo reflector 590. Therefore, reflection tape is not required to put on the lower cover 700 for providing the first reflection part 716c and the second reflection part 717c for the first photo reflector 580 and the second photo reflector 590.

In addition, the bottom part of the photographing unit 1 is the circuit board 15 whose circuit board face 151 is mounted with the first photo reflector 580 and the second photo reflector 590 and the imaging element 1b is mounted on the circuit board face 152 on the opposite side of the circuit board 15. Therefore, the first photo reflector 580 and the second photo reflector 590 are mounted on the same circuit board 15 for the imaging element 1b and thus the number of part items is reduced.

Second Embodiment

Figure 11:
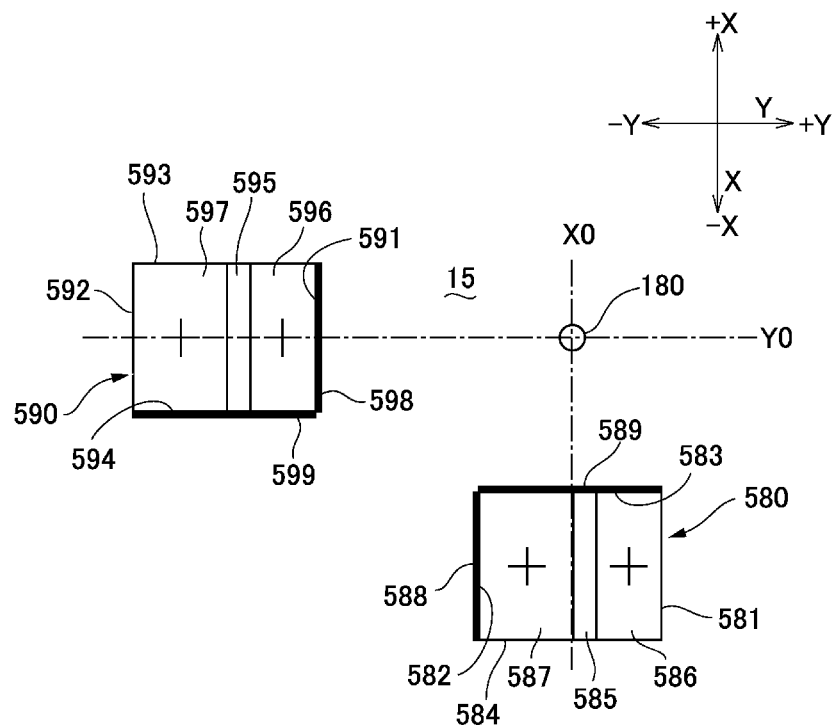
FIG. 11 is an explanatory view showing a layout of two photo reflectors in an optical unit with a shake correcting function in accordance with a second embodiment of the present invention.

FIG. 11 is an explanatory view showing a layout of two photo reflectors in an optical unit 100 with a shake correcting function in accordance with a second embodiment of the present invention. A basic structure in the second embodiment is similar to the first embodiment and thus the common portions are shown with the same reference sign and their descriptions are omitted. As shown in FIG. 11, also in the optical unit 100 with a shake correcting function in this embodiment, similarly to the first embodiment, the first photo reflector 580 is disposed at a position superposing on the axial line "X0" in the optical axis "L" direction and the second photo reflector 590 is disposed at a position superposing on the axial line "Y0" in the optical "L" direction. Further, the first photo reflector 580 and the second photo reflector 590 are disposed so that their long sides 583, 584, 593 and 594 are extended in the "Y"-axis direction and are parallel to the extended direction of the strip-shaped portion 411 of the flexible circuit board 410 as described with reference to FIGS. 6 through 9(c). Further, the first photo reflector 580 and the second photo reflector 590 are disposed so that their light emitting parts 586 and 596 are located on one side "+Y" in the "Y"-axis direction and their light receiving parts 587 and 597 are located on the other side "−Y" in the "Y"-axis direction.

In the first photo reflector 580 and the second photo reflector 590 structured as described above, the light emitted from the light emitting part 596 of the second photo reflector 590 may be incident on the first photo reflector 580 through a space between the first photo reflector 580 and the second photo reflector 590. Further, in a case that the circuit board 15 has translucency like a glass-epoxy circuit board, the light emitted from the light emitting part 596 of the second photo reflector 590 may be incident on the first photo reflector 580 through the circuit board 15.

In order to prevent this problem, in this embodiment, in four side face parts of the first photo reflector 580 disposed in directions intersecting the optical axis "L" direction, light shielding layers 588 and 589 are provided on two side faces which face the second photo reflector 590. Further, in four side face parts of the second photo reflector 590 disposed in directions intersecting the optical axis "L" direction, light shielding layers 598 and 599 are provided on two side faces which face the first photo reflector 580. Specifically, the light shielding layers 588 and 589 are provided on the side faces corresponding to the short side 582 and the long side 583 of the first photo reflector 580 which are located on the second photo reflector 590 side and the light shielding layers 598 and 599 are provided on the side faces corresponding to the short side 591 and the long side 594 of the second photo reflector 590 which are located on the first photo reflector 580 side. Therefore, the light emitted from the light emitting part 596 of the second photo reflector 590 is not incident on the light receiving part 587 of the first photo reflector 580.

In this embodiment, a separated distance between the light emitting part 586 of the first photo reflector 580 and the light receiving part 597 of the second photo reflector 590 is longer than the separated distance between the light receiving part 587 of the first photo reflector 580 and the light emitting part 596 of the second photo reflector 590. Therefore, there is a little possibility that the light emitted from the light emitting part 586 of the first photo reflector 580 is incident on the light receiving part 597 of the second photo reflector 590. However, in this embodiment, the light shielding layers 588 and 589 are formed on the entire two side faces of the first photo reflector 580 which face the second photo reflector 590 and the light shielding layers 598 and 599 are provided on the entire two side faces of the second photo reflector 590 which face the first photo reflector 580. Therefore, the light emitted from the light emitting part 586 of the first photo reflector 580 is surely prevented from being incident on the light receiving part 597 of the second photo reflector 590.

As a result, according to this embodiment, a cross talk does not occur between the first photo reflector 580 and the second photo reflector 590 and thus displacement of the photographing unit 1 when turned around the axial line "X0" and displacement of the photographing unit 1 when turned around the axial line "Y0" can be monitored surely.

Third Embodiment

Figure 12A:
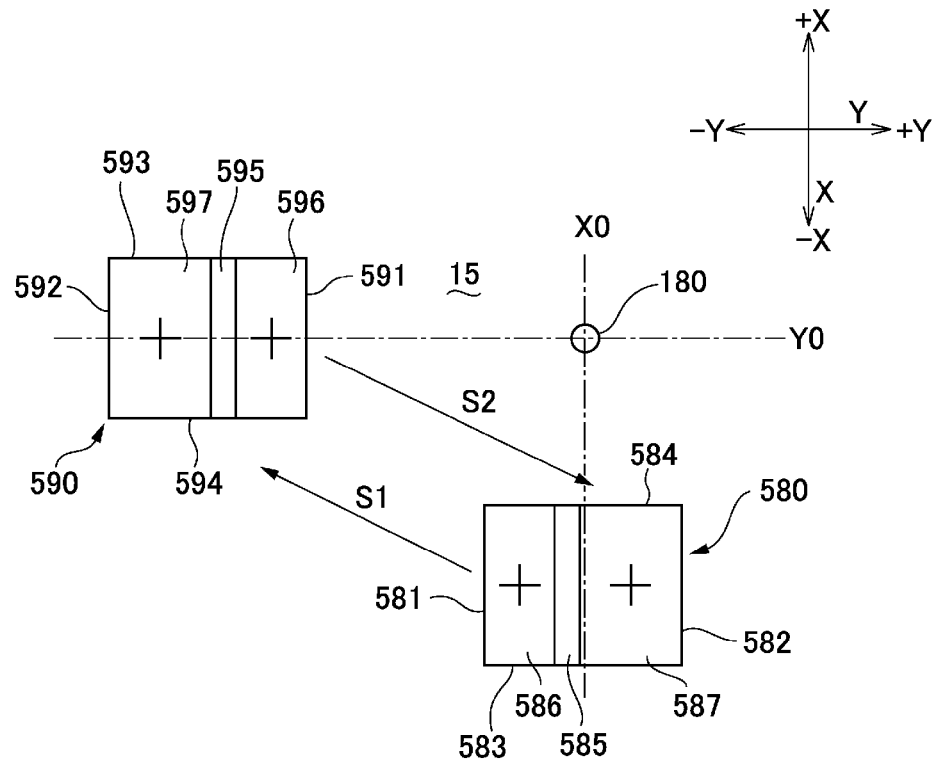
FIGS. 12(a) and 12(b) are explanatory views showing a layout of two photo reflectors in an optical unit with a shake correcting function in accordance with a third embodiment of the present invention.
Figure 12B:
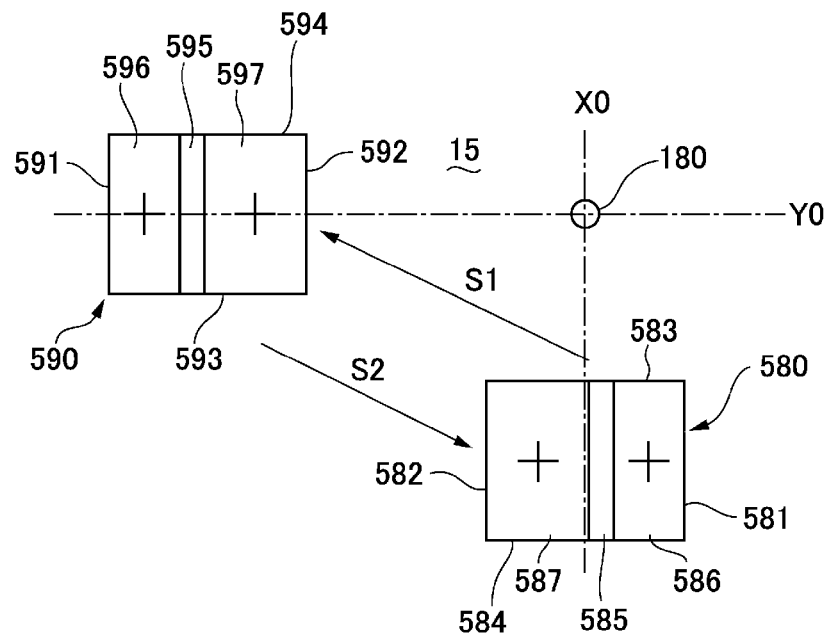

FIGS. 12(a) and 12(b) are explanatory views showing a layout of two photo reflectors in an optical unit 100 with a shake correcting function in accordance with a third embodiment of the present invention. FIG. 12(a) is an explanatory view showing an embodiment where respective light emitting parts are set close to each other and FIG. 12(b) is an explanatory view showing an embodiment where respective light receiving parts are set close to each other. A basic structure in the third embodiment is similar to the first embodiment and thus the common portions are shown with the same reference sign and their descriptions are omitted. As shown in FIG. 12(a), also in the optical unit 100 with a shake correcting function in this embodiment, similarly to the first embodiment, the first photo reflector 580 is disposed at a position superposing on the axial line "X0" in the optical axis "L" direction and the second photo reflector 590 is disposed at a position superposing on the axial line "Y0" in the optical axis "L" direction. Further, the first photo reflector 580 and the second photo reflector 590 are disposed so that their long sides 583, 584, 593 and 594 are extended in the "Y"-axis direction and are parallel to the extended direction of the strip-shaped portion 411 of the flexible circuit board 410 as described with reference to FIGS. 6 through 9(c).

In this embodiment, the first photo reflector 580 and the second photo reflector 590 are disposed so that the light emitting parts 586 and 596 are set close to each other and the light receiving parts 587 and 597 are set apart from each other. In other words, the light emitting part 586 of the first photo reflector 580 is disposed on a side where the second photo reflector 590 is located and the light emitting part 596 of the second photo reflector 590 is disposed on a side where the first photo reflector 580 is located. Further, the light receiving part 587 of the first photo reflector 580 is disposed on an opposite side with respect to the second photo reflector 590 and the light receiving part 597 of the second photo reflector 590 is disposed on an opposite side with respect to the first photo reflector 580.

Also in the first photo reflector 580 and the second photo reflector 590 structured as described above, there is a possibility that the light emitted from the light emitting part 596 of the second photo reflector 590 is incident on the first photo reflector 580 and the light emitted from the light emitting part 596 of the second photo reflector 590 is incident on the first photo reflector 580. However, in this embodiment, the first photo reflector 580 and the second photo reflector 590 are disposed so that the light emitting parts 586 and 596 are set close to each other and the light receiving parts 587 and 597 are set away from each other. Therefore, in this embodiment, in comparison with the embodiment described with reference to FIG. 10, a distance from the light emitting part 596 of the second photo reflector 590 to the light receiving part 587 of the first photo reflector 580 is long. Accordingly, even when the light emitted from the light emitting part 586 of the first photo reflector 580 is directed toward the second photo reflector 590 as shown by the arrow "S1", the light is hard and difficult to be incident on the light receiving part 597 of the second photo reflector 590. Further, even when the light emitted from the light emitting part 596 of the second photo reflector 590 is directed toward the first photo reflector 580 as shown by the arrow "S2", the light is hard and difficult to be incident on the light receiving part 587 of the first photo reflector 580. Accordingly, a cross talk does not occur between the first photo reflector 580 and the second photo reflector 590 and thus displacement of the photographing unit 1 when turned around the axial line "X0" and displacement of the photographing unit 1 when turned around the axial line "Y0" can be monitored surely.

In accordance with an embodiment of the present invention, contrary to the structure shown in FIG. 12(a), as shown in FIG. 12(b), it may be structured that the light receiving parts 587 and 597 of the first photo reflector 580 and the second photo reflector 590 are set close to each other and the light emitting parts 586 and 596 are set apart from each other. Also in this case, similar effects to the embodiment shown in FIG. 12(a) can be obtained.

Fourth Embodiment

Figure 13A:
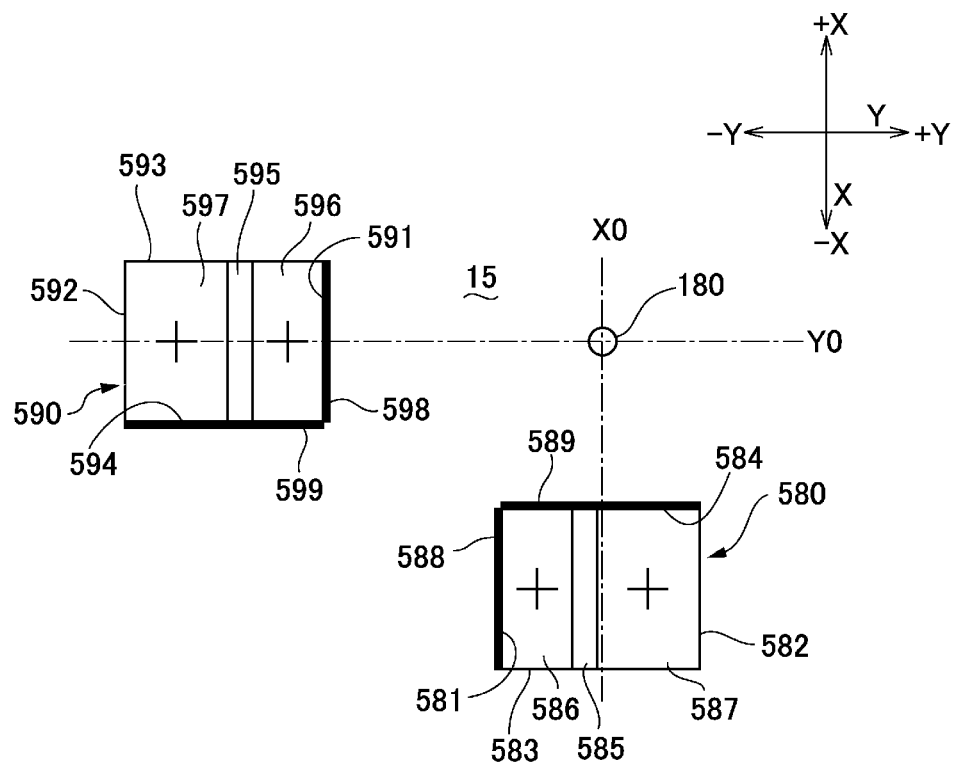
FIGS. 13(a) and 13(b) are explanatory views showing a layout of two photo reflectors in an optical unit with a shake correcting function in accordance with a fourth embodiment of the present invention.
Figure 13B:
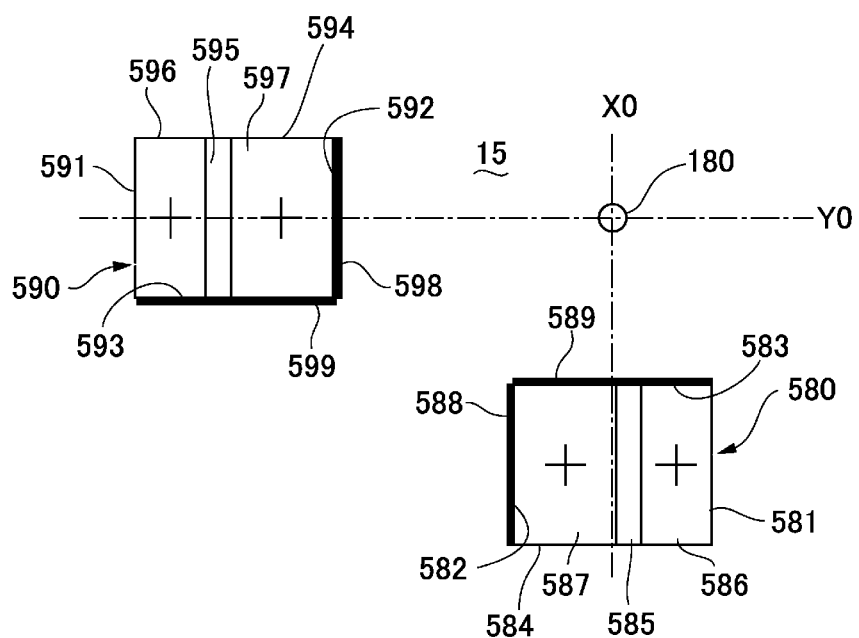

FIGS. 13(a) and 13(b) are explanatory views showing a layout of two photo reflectors in an optical unit 100 with a shake correcting function in accordance with a fourth embodiment of the present invention. FIG. 13(a) is an explanatory view showing an embodiment where respective light emitting parts are set close to each other and FIG. 13(b) is an explanatory view showing an embodiment where respective light receiving parts are set close to each other. A basic structure in the fourth embodiment is similar to the first embodiment and thus the common portions are shown with the same reference sign and their descriptions are omitted. As shown in FIG. 13(a), also in the optical unit 100 with a shake correcting function in this embodiment, similarly to the first embodiment, the first photo reflector 580 is disposed at a position superposing on the axial line "X0" in the optical axis "L" direction and the second photo reflector 590 is disposed at a position superposing on the axial line "Y0" in the optical axis "L" direction. Further, the first photo reflector 580 and the second photo reflector 590 are disposed so that their long sides 583, 584, 593 and 594 are extended in the "Y"-axis direction and are parallel to the extended direction of the strip-shaped portion 411 of the flexible circuit board 410 as described with reference to FIGS. 6 through 9(c).

In the embodiment shown in FIG. 13(a), similarly to the third embodiment, the first photo reflector 580 and the second photo reflector 590 are disposed so that the light emitting parts 586 and 596 are set close to each other and the light receiving parts 587 and 597 are set apart from each other.

Further, in this embodiment, similarly to the second embodiment, in four side face parts of the first photo reflector 580, two side faces located on a side which face the second photo reflector 590 are provided with light shielding layers 588 and 589 and, in four side face parts of the second photo reflector 590, two side faces located on a side which face the first photo reflector 580 are provided with light shielding layers 598 and 599. Therefore, the light emitted from the light emitting part 586 of the first photo reflector 580 is not incident on the light receiving part 597 of the second photo reflector 590. Further, the light emitted from the light emitting part 596 of the second photo reflector 590 is not incident on the light receiving part 587 of the first photo reflector 580. Accordingly, a cross talk does not occur between the first photo reflector 580 and the second photo reflector 590 and thus displacement of the photographing unit 1 when turned around the axial line "X0" and displacement of the photographing unit 1 when turned around the axial line "Y0" can be monitored surely.

Further, in this embodiment, different from the second embodiment, the positions of the light shielding layers 588, 589, 598 and 599 in the first photo reflector 580 and the second photo reflector 590 are set in a point symmetrical relationship. Therefore, a photo reflector having the same structure can be used for the first photo reflector 580 and the second photo reflector 590 and thus the photo reflector can be used in common.

Contrary to the structure shown in FIG. 13(a), as shown in FIG. 13(b), it may be structured that the light receiving parts 587 and 597 of the first photo reflector 580 and the second photo reflector 590 are set close to each other and the light emitting parts 586 and 596 are set apart from each other. Also in this case, similar effects to the embodiment shown in FIG. 13(a) can be obtained.

(Modified Examples of First Reflection Part 716c and Second Reflection Part 717c)

In the embodiment described above, the first reflection part 716c and the second reflection part 717c for the first photo reflector 580 and the second photo reflector 590 are formed of the inner bottom faces of the recessed parts 716 and 717 which are provided in the bottom plate part 710 of the lower cover 700. However, it may be structured that the first reflection part and the second reflection part are formed in the same plane as the surrounding portion around the first reflection part and the surrounding portion around the second reflection part of the lower cover 700. Also in the case having this structure, in comparison with a case that the first reflection part and the second reflection part are protruded toward the bottom part of the photographing unit 1, a portion close to the bottom part of the photographing unit 1 can be provided in the lower cover 700 and the swing support point 180 can be provided in the close portion. Therefore, the region where the swing support point 180 occupies is narrowed and thus a space for disposing the first photo reflector 580 and the second photo reflector 590 is secured.

Other Embodiments

In the embodiment shown in FIG. 11 and FIGS. 13(a) and 13(b), in order to prevent a cross talk between the first photo reflector 580 and the second photo reflector 590, the light shielding layer is provided on two side faces located on a side facing the second photo reflector 590 in four side face parts of the first photo reflector 580 and the light shielding layers are provided on two side faces located on a side facing the first photo reflector 580 in four side face parts of the second photo reflector 590. However, the light shielding layer may be provided all of four side face parts of the first photo reflector 580 and the second photo reflector 590.

Further, in the embodiment shown in FIG. 11 and FIGS. 13(a) and 13(b), the light shielding layer is provided on the side faces of both of the first photo reflector 580 and the second photo reflector 590. However, in order to prevent a cross talk between the first photo reflector 580 and the second photo reflector 590, the light shielding layer may be provided on only the side face parts of one of the first photo reflector 580 and the second photo reflector 590.

In the embodiments described above, the present invention is, as an example, applied to the optical unit 100 which is used in a cell phone with a camera. However, at least an embodiment of the present invention may be applied to the optical unit 100 which is used in a thin type digital camera or the like. Further, in the embodiment described above, the lens drive mechanism 5 which magnetically drives the movable body 3 including the photographing unit 1 having the lens 1a and the imaging element 1b in the optical axis direction is supported on the support body 2. However, at least an embodiment of the present invention may be applied to a fixed focus type optical unit in which the lens drive mechanism 5 is not mounted on the photographing unit 1.

In addition, other than a cell phone, a digital camera and the like, the optical unit 100 with a shake correcting function to which at least an embodiment of the present invention is applied may be fixed in an apparatus such as a refrigerator in which vibration is occurred in a certain interval and mounted so as to be capable of being remote controlled. According to the apparatus, a service can be provided in which information in the inside of the refrigerator is obtained at a visit place, for example, at the time of shopping. According to this service, the camera system is provided with an attitude stabilizing device and thus a stable image can be transmitted even when vibration may occur in the refrigerator. Further, this device may be fixed to a device such as a bag, a satchel or a cap of a child and a student which is carried at a time of commuting or attending school. In this case, states of surroundings are photographed at a constant interval and, when the image is transmitted to a predetermined server, the parent or the like watches the image at a remote place to secure security of the child. In this application, without conscious of a camera, a clear image is photographed even when vibration occurs at the time of moving. Further, when a GPS is mounted in addition to a camera module, the position of a target person can be obtained simultaneously and thus, when an accident occurs, its position and situation can be confirmed immediately. In addition, when the optical unit 100 with a shake correcting function to which at least an embodiment of the present invention is applied is mounted at a position which is capable of photographing toward a front side in a car, it can be used as a drive recorder. Further, it may be structured that the optical unit 100 with a shake correcting function to which at least an embodiment of the present invention is applied is mounted at a position which is capable of photographing toward a front side in a car and a front side image is photographed automatically at a constant interval and is automatically transmitted to a predetermined server. Further, when this image is distributed while interlocking with traffic jam information in the VICS (Vehicle Information and Communication System) of a car navigation system, the situation of a traffic jam can be provided further in detail. According to this service, similarly to a drive recorder mounted on a car, the situation when an accident has occurred can be recorded by a third person of passer-by without intention to utilize an inspection of the situation. Further, a clear image can be acquired without affected by vibration of a car. In a case of the application, when a power supply is turned on, a command signal is outputted to the control section and the shake control is started on the basis of the command signal.

Further, the optical unit 100 with a shake correcting function to which at least an embodiment of the present invention is applied may be applied to shake correction of an optical device from which a light beam is emitted such as a laser beam pointer, a portable or on-vehicle projection display device and direct viewing type display device. Further, in an observation system with a high magnification such as an astronomical telescope system or a binocular system, the optical unit 100 may be used to observe without using an auxiliary locking device such as three-legged supports. In addition, when at least an embodiment of the present invention is applied to a rifle or a turret of a tank, its attitude can be stabilized against vibration at the time of trigger and thus hitting accuracy can be enhanced.

While the description above refers to particular embodiments of the p resent invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An optical unit with a shake correcting function comprising:
    a fixed body;
    a movable module which holds an optical element;
    a swing support point which swingably supports the movable module between a bottom part of the movable module and the fixed body;
    a shake correction drive mechanism which is structured to swing the movable module with the swing support point as a swing center around two axial lines intersecting an optical axis direction of the optical element between an outer peripheral face of the movable module and the fixed body;
    a first photo reflector which is provided between a bottom part of the movable module and the fixed body at a position superposing on one of the two axial lines in the optical axis direction and is structured to detect displacement of the movable module; and
    a second photo reflector which is provided between the bottom part of the movable module and the fixed body at a position superposing on the other of the two axial lines in the optical axis direction and is structured to detect displacement of the movable module;
    wherein the bottom part of the movable module includes a circuit board on which the first photo reflector and the second photo reflector are mounted, and
    a face of the circuit board on an opposite side to a face where the first photo reflector and the second photo reflector are mounted is mounted with an imaging element.

2. The optical unit with a shake correcting function according to claim 1, further comprising a flexible circuit board which is extended in a direction intersecting the optical axis direction between the bottom part of the movable module and the fixed body so as to avoid positions superposing on the first photo reflector and the second photo reflector in the optical axis direction,
    wherein each of the first photo reflector and the second photo reflector is provided with a rectangular planar shape, and extended directions of long sides of the first photo reflector and the second photo reflector are parallel to an extended direction of the flexible circuit board.

3. The optical unit with a shake correcting function according to claim 2, wherein the light emitting part of the first photo reflector is disposed on a side where the second photo reflector is located and the light emitting part of the second photo reflector is disposed on a side where the first photo reflector is located, or the light receiving part of the first photo reflector is disposed on a side where the second photo reflector is located and the light receiving part of the second photo reflector is disposed on a side where the first photo reflector is located.

4. The optical unit with a shake correcting function according to claim 2, further comprising
    a light shielding layer which is provided on at least two side faces of four side face parts of the first photo reflector in which the four side face parts are set in directions intersecting the optical axis direction, at least the two side faces provided with the light shielding layer being disposed on a side where the second photo reflector is located, and
    a light shielding layer which is provided on at least two side faces of four side face parts of the second photo reflector in which the four side face parts are set in directions intersecting the optical axis direction, at least the two side faces provided with the light shielding layer being disposed on a side where the first photo reflector is located.

5. The optical unit with a shake correcting function according to claim 2, further comprising:
   a first reflection part which is provided in the fixed body so as to superpose on the first photo reflector in the optical axis direction, and
   a second reflection part which is provided in the fixed body so as to superpose on the second photo reflector in the optical axis direction,
   wherein the first photo reflector and the second photo reflector are provided in the bottom part of the movable module, and
   wherein the first reflection part and the second reflection part are recessed in a direction apart from the bottom part of the movable module with respect to a portion of the fixed body which is located around the first reflection part and a portion of the fixed body which is located around the second reflection part.

6. The optical unit with a shake correcting function according to claim 2, further comprising:
   a first reflection part which is provided in the fixed body so as to superpose on the first photo reflector in the optical axis direction, and
   a second reflection part which is provided in the fixed body so as to superpose on the second photo reflector in the optical axis direction,
   wherein the first photo reflector and the second photo reflector are provided in the bottom part of the movable module, and
   wherein the first reflection part and the second reflection part are formed in a same plane with respect to a portion of the fixed body which is located around the first reflection part and a portion of the fixed body which is located around the second reflection part.

7. The optical unit with a shake correcting function according to claim 2, wherein a portion of the fixed body which faces the bottom part of the movable module is structured of a metal member that is non-magnetized by heat treatment.

8. The optical unit with a shake correcting function according to claim 1, further comprising
   a light shielding layer which is provided on at least two side faces of four side face parts of the first photo reflector in which the four side face parts are set in directions intersecting the optical axis direction, at least the two side faces provided with the light shielding layer being disposed on a side where the second photo reflector is located, and
   a light shielding layer which is provided on at least two side faces of four side face parts of the second photo reflector in which the four side face parts are set in directions intersecting the optical axis direction, at least the two side faces provided with the light shielding layer being disposed on a side where the first photo reflector is located.

9. The optical unit with a shake correcting function according to claim 8, further comprising:
   a first reflection part which is provided in the fixed body so as to superpose on the first photo reflector in the optical axis direction, and
   a second reflection part which is provided in the fixed body so as to superpose on the second photo reflector in the optical axis direction,
   wherein the first photo reflector and the second photo reflector are provided in the bottom part of the movable module, and
   wherein the first reflection part and the second reflection part are recessed in a direction apart from the bottom part of the movable module with respect to a portion of the fixed body which is located around the first reflection part and a portion of the fixed body which is located around the second reflection part.

10. The optical unit with a shake correcting function according to claim 8, further comprising:
    a first reflection part which is provided in the fixed body so as to superpose on the first photo reflector in the optical axis direction, and
    a second reflection part which is provided in the fixed body so as to superpose on the second photo reflector in the optical axis direction,
    wherein the first photo reflector and the second photo reflector are provided in the bottom part of the movable module, and
    wherein the first reflection part and the second reflection part are formed in a same plane with respect to a portion of the fixed body which is located around the first reflection part and a portion of the fixed body which is located around the second reflection part.

11. The optical unit with a shake correcting function according to claim 8, wherein a portion of the fixed body which faces the bottom part of the movable module is structured of a metal member that is non-magnetized by heat treatment.

12. The optical unit with a shake correcting function according to claim 1 wherein a portion of the fixed body which faces the bottom part of the movable module is structured of a metal member that is non-magnetized by heat treatment.

13. The optical unit with a shake correcting function according to claim 1, further comprising a flexible circuit board which is disposed between the bottom part of the movable module and the fixed body and is provided with a strip-shaped portion having a folded-back portion that is extended in a direction intersecting the optical axis direction and is folded back in a reverse direction and fixed to the movable module,
    wherein the strip-shaped portion is disposed so as to avoid positions superposing on the first photo reflector and the second photo reflector in the optical axis direction.

14. The optical unit with a shake correcting function according to claim 13, wherein
    the strip-shaped portion of the flexible circuit board is formed with a slit which is extended along an extended direction of the strip-shaped portion in a midway portion in the extended direction, and
    one of the first photo reflector and the second photo reflector is disposed at a position superposing on the slit of the flexible circuit board.

15. The optical unit with a shake correcting function according to claim 14, wherein
    the shake correction drive mechanism comprises four flat plate-shaped permanent magnets, which are fixed to four outer faces of a case having a rectangular tube-shaped body part structuring the movable module, and four coil parts which are disposed on four inner faces of a cover having a rectangular tube-shaped body part structuring the fixed body,
    the movable module is swung around the two axial lines by the four permanent magnets and the four coil parts, and
    the extended direction of the slit which is formed in the strip-shaped portion of the flexible circuit board is the same direction as one of the two axial lines.

16. The optical unit with a shake correcting function according to claim 14, wherein
- each of the first photo reflector and the second photo reflector is structured of a light emitting part, a light receiving part and a light intercepting part between the light emitting part and the light receiving part, and
- the light emitting part and the light receiving part of each of the first photo reflector and the second photo reflector are disposed in the extended direction of the slit which is formed in the strip-shaped portion of the flexible circuit board.

17. The optical unit with a shake correcting function according to claim 16, further comprising;
- a light shielding layer provided on at least a side face of the first photo reflector which is located on a second photo reflector side, or a light shielding layer provided on at least a side face of the second photo reflector which is located on a first photo reflector side.

* * * * *